United States Patent
Li

(10) Patent No.: US 9,689,591 B2
(45) Date of Patent: Jun. 27, 2017

(54) SECTIONAL REGENERATIVE THIRD-TYPE ABSORPTION HEAT PUMP

(76) Inventor: Huayu Li, Qingdao (CN)

( * ) Notice: Subject to any disclaimer, the term of this patent is extended or adjusted under 35 U.S.C. 154(b) by 477 days.

(21) Appl. No.: 14/398,470

(22) PCT Filed: Aug. 17, 2012

(86) PCT No.: PCT/CN2012/001106
§ 371 (c)(1),
(2), (4) Date: Feb. 9, 2015

(87) PCT Pub. No.: WO2013/163784
PCT Pub. Date: Nov. 7, 2013

(65) Prior Publication Data
US 2015/0233610 A1 Aug. 20, 2015

(30) Foreign Application Priority Data

May 4, 2012 (CN) .......................... 2012 1 0149935

(51) Int. Cl.
| | |
|---|---|
| *F25B 15/06* | (2006.01) |
| *F25B 15/02* | (2006.01) |
| *F25B 15/00* | (2006.01) |
| *F25B 30/04* | (2006.01) |
| *F25B 27/02* | (2006.01) |

(52) U.S. Cl.
CPC ................... *F25B 15/006* (2013.01)

(58) Field of Classification Search
CPC ...... F25B 15/006; F25B 30/04; F25B 15/008; F25B 27/02; F25B 15/00; F25B 2315/00; F25B 15/02; F25B 2333/007; F25B 2333/003; F25B 15/06; Y02B 30/62; Y02B 30/625

See application file for complete search history.

(56) References Cited

U.S. PATENT DOCUMENTS

| | | | | |
|---|---|---|---|---|
| 4,085,596 A | * | 4/1978 | Miyamoto | ............ F25B 15/008 62/476 |
| 4,439,999 A | * | 4/1984 | Mori | ..................... F25B 15/008 62/238.3 |
| 4,520,634 A | * | 6/1985 | Oouchi | ................. F25B 15/008 62/476 |

(Continued)

*Primary Examiner* — Ryan J Walters
*Assistant Examiner* — Martha Tadesse

(57) ABSTRACT

The invention provides the sectional regenerative third-type absorption heat pump which belongs to low-temperature waste heat utilization and refrigeration technique filed. It mainly comprises four generators, four absorbers, a condenser, an evaporator, a throttle, four solution pumps and four solution heat exchangers. The refrigerant vapor of the first generator is provided for condenser. The refrigerant liquid of condenser is provided for evaporator. The refrigerant vapor of evaporator is provided for the first absorber. The second generator and the second absorber, the third generator and the third absorber respectively form the driving heat sectional regenerative process. The third generator and the third absorber form the waste heat regenerative process. The first absorber, the second absorber and the third absorber supply heat to the condenser. The fourth absorber releases the low temperature heat. The sectional regenerative third-type absorption heat pump is thereby formed.

17 Claims, 11 Drawing Sheets

(56) References Cited

U.S. PATENT DOCUMENTS

| | | | | |
|---|---|---|---|---|
| 5,517,830 A * | 5/1996 | Ohuchi | ..................... | F24F 3/06 |
| | | | | 62/324.2 |
| 6,128,917 A * | 10/2000 | Riesch | .................... | F25B 15/12 |
| | | | | 62/476 |
| 6,536,229 B1 * | 3/2003 | Takabatake | ........... | F25B 15/008 |
| | | | | 62/101 |
| 7,464,562 B2 * | 12/2008 | Inoue | ................... | F25B 15/008 |
| | | | | 62/324.2 |
| 8,756,946 B2 * | 6/2014 | Li | ........................... | F25B 30/04 |
| | | | | 62/119 |
| 2006/0230776 A1 * | 10/2006 | Inoue | ................... | F25B 15/008 |
| | | | | 62/324.2 |

\* cited by examiner

SECTIONAL REGENERATIVE THIRD-TYPE ABSORPTION HEAT PUMP

FIELD

The present invention belongs to the area of low-temperature waste heat utilization and refrigeration technique.

BACKGROUND

In the place with abundant waste heat resource, it is the best technology to enhance heat utilization ratio by adopting the third-type absorption heat pump. Adopting single generator can't realize the depth utilization of the thermal driving medium and the comprehensive utilization of various high temperature heat resources when the temperature changing range of the thermal driving medium is large, or driving heat medium is pluralism, the grade and the heat load of driving heat medium are difference. Two or more generators with corresponding absorbers are considered to adopt now. The multiple regenerative processes should be used to realize the depth utilization of the thermal driving medium and the comprehensive utilization of various high temperature heat resources. To use the waste heat resources deeply, the regenerative process is completed by the low-temperature generator and the low-temperature condenser, or the waste heat regenerative process is formed by the low-temperature generator and the low-temperature absorber. Adopting the regenerative processes can realize multi-terminal heat supply of the heated medium, meet the big temperature difference heating of the heated medium, achieve a reasonable thermodynamics perfect degree and promote the waste heat utilization ratio. Meanwhile, the heat load of the high-temperature heating port is adjustable. The performance index of the third-type absorption heat pump is continuous and reasonable in a certain range.

THE CONTENTS OF THE INVENTION

The mainly purpose of the invention is providing the sectional regenerative third-type absorption heat pump. The specific method is as follows.

1. The sectional regenerative third-type absorption heat pump mainly comprises a first generator, a second generator, a third generator, a fourth generator, a first absorber, a second absorber, a third absorber, a condenser, a second condenser, an evaporator, a throttle valve, a refrigerant liquid pump, a first solution pump, a second solution pump, a first solution heat exchanger, a second solution heat exchanger, a third solution heat exchanger and a fourth solution heat exchanger. The dilute solution pipe of the first absorber communicates with the third absorber via the first solution pump and the first solution heat exchanger. The dilute solution pipe of the third absorber communicates with the second absorber via the second solution pump and the second solution heat exchanger. The dilute solution pipe of the second absorber communicates with the fourth generator via the third solution heat exchanger. The concentrated solution pipe of the fourth generator communicates with the first generator via the third solution pump, the third solution heat exchanger and the fourth solution heat exchanger. The concentrated solution pipe of the second generator communicates with the third generator via the second solution heat exchanger. The concentrated solution pipe of the third generator communicates with the first absorber via the first solution heat exchanger. The refrigerant vapor channel of the first generator communicates with the condenser. The refrigerant vapor channel of the second generator communicates with the second absorber. The refrigerant vapor channel of the third generator communicates with the third absorber. The refrigerant vapor channel of the fourth generator communicates with the second condenser. The refrigerant liquid pipe of the condenser communicates with the evaporator via the throttle valve. The refrigerant liquid pipe of the second condenser communicates with the evaporator via the refrigerant liquid pump. The thermal driving medium pipes of the first generator, the second generator and the third generator communicate with the external respectively. The waste heat medium pipes of the fourth generator and the evaporator communicate with the external respectively. The heated medium pipes of the first absorber, the second absorber, the third absorber and the condenser communicate with the external respectively. The cooling medium pipe of the second condenser communicates with the external. The sectional regenerative third-type absorption heat pump is thereby formed.

2. The sectional regenerative third-type absorption heat pump mainly comprises a first generator, a second generator, a third generator, a fourth generator, a first absorber, a second absorber, a third absorber, a condenser, a second condenser, an evaporator, a throttle valve, a refrigerant liquid pump, a first solution pump, a second solution pump, a first solution heat exchanger, a second solution heat exchanger, a third solution heat exchanger and a fourth solution heat exchanger. The dilute solution pipe of the first absorber communicates with the third absorber via the first solution pump and the first solution heat exchanger. The dilute solution pipe of the third absorber communicates with the second absorber via the second solution pump and the second solution heat exchanger. The dilute solution pipe of the second absorber communicates with the first generator via the third solution pump, the third solution heat exchanger and the fourth solution heat exchanger. The concentrated solution pipe of the first generator communicates with the fourth generator via the fourth solution heat exchanger. The concentrated solution pipe of the fourth generator communicates with the second generator via the fourth solution pump and the third solution heat exchanger. The concentrated solution pipe of the second generator communicates with the third generator via the second solution heat exchanger. The concentrated solution pipe of the third generator communicates with the first absorber via the first solution heat exchanger. The refrigerant vapor channel of the first generator communicates with the condenser. The refrigerant vapor channel of the second generator communicates with the second absorber. The refrigerant vapor channel of the third generator communicates with the third absorber. The refrigerant vapor channel of the fourth generator communicates with the second condenser. The refrigerant liquid pipe of the condenser communicates with the evaporator via the throttle valve. The refrigerant liquid pipe of the second condenser communicates with the evaporator via the refrigerant liquid pump. The refrigerant vapor channel of the evaporator communicates with the first absorber. The thermal driving medium pipes of the first generator, the second generator and the third generator communicate with the external respectively. The waste heat medium pipes of the fourth generator and the evaporator communicate with the external respectively. The heated medium pipes of the first absorber, the second absorber, the third absorber and the condenser communicate with the external respectively. The cooling medium pipe of the second condenser communicates with the external. The sectional regenerative third-type absorption heat pump is thereby formed.

3. The sectional regenerative third-type absorption heat pump mainly comprises a first generator, a second generator, a third generator, a fourth generator, a first absorber, a second absorber, a third absorber, a condenser, a second condenser, an evaporator, a throttle valve, a refrigerant liquid pump, a first solution pump, a second solution pump, a first solution heat exchanger, a second solution heat exchanger, a third solution heat exchanger and a fourth solution heat exchanger. The dilute solution pipe of the first absorber communicates with the third absorber via the first solution pump and the first solution heat exchanger. The dilute solution pipe of the third absorber communicates with the second absorber via the second solution pump and the second solution heat exchanger. The dilute solution pipe of the second absorber communicates with the first generator via the third solution pump and the third solution heat exchanger. The concentrated solution pipe of the first generator communicates with the second generator via the third solution heat exchanger. The concentrated solution pipe of the first generator communicates with the second generator via the third solution heat exchanger. The concentrated solution pipe of the second generator communicates with the third generator via the second solution heat exchanger. The concentrated solution pipe of the third generator communicates with the fourth generator via the first solution heat exchanger and the fourth solution heat exchanger. The concentrated solution pipe of the fourth generator communicates with the first absorber via the fourth solution pump and the fourth solution heat exchanger. The refrigerant vapor channel of the first generator communicates with the condenser. The refrigerant vapor channel of the second generator communicates with the second absorber. The refrigerant vapor channel of the third generator communicates with the third absorber. The refrigerant vapor channel of the fourth generator communicates with the second condenser. The refrigerant liquid pipe of the condenser communicates with the evaporator via the throttle valve. The refrigerant liquid pipe of the second condenser communicates with the evaporator via the refrigerant liquid pump. The refrigerant vapor channel of the evaporator communicates with the first absorber. The thermal driving medium pipes of the first generator, the second generator and the third generator communicate with the external respectively. The waste heat medium pipes of the fourth generator and the evaporator communicate with the external respectively. The heated medium pipes of the first absorber, the second absorber, the third absorber and the condenser communicate with the external respectively. The cooling medium pipe of the second condenser communicates with the external. The sectional regenerative third-type absorption heat pump is thereby formed.

4. The sectional regenerative third-type absorption heat pump mainly comprises a first generator, a second generator, a third generator, a fourth generator, a first absorber, a second absorber, a third absorber, a fourth absorber, a condenser, an evaporator, a throttle valve, a first solution pump, a second solution pump, a third solution pump, a fourth solution pump, a first solution heat exchanger, a second solution heat exchanger, a third solution heat exchanger and a fourth solution heat exchanger. The dilute solution pipe of the fourth absorber communicates with the third absorber via the first solution pump and the second solution heat exchanger. The dilute solution pipe of the third absorber communicates with the second absorber via the second solution pump and the second solution heat exchanger. The dilute solution pipe of the second absorber communicates with the first generator via the third solution pump and the third solution heat exchanger. The concentrated solution pipe of the first generator communicates with the second generator via the third solution heat exchanger. The concentrated solution pipe of the second generator communicates with the third generator via the second solution heat exchanger. The concentrated solution pipe of the third generator communicates with the fourth generator via the first solution heat exchanger. The concentrated solution pipe of the fourth generator communicates with the first absorber via the fourth solution pump and the fourth solution heat exchanger. The refrigerant vapor channel of the first generator communicates with the condenser. The refrigerant vapor channel of the second generator communicates with the second absorber6. The refrigerant vapor channel of the third generator communicates with the third absorber. The refrigerant vapor channel of the fourth generator communicates with the fourth absorber. The refrigerant liquid pipe of the condenser communicates with the evaporator via the throttle valve. The refrigerant vapor channel of the evaporator communicates with the first absorber. The thermal driving medium pipe of the first generator, the second generator and the third generator respectively communicates with the external. The waste heat medium pipes of the fourth generator and the evaporator communicate with the external respectively. The heated medium pipes of the first absorber, the second absorber, the third absorber and the condenser communicate with the external respectively. The cooling medium pipe of the fourth absorber communicates with the external. The sectional regenerative third-type absorption heat pump is thereby formed.

5. The sectional regenerative third-type absorption heat pump mainly comprises a first generator, a second generator, a third generator, a fourth generator, a first absorber, a second absorber, a third absorber, a fourth absorber, a condenser, an evaporator, a throttle valve, a first solution pump, a second solution pump, a third solution pump, a fourth solution pump, a first solution heat exchanger, a second solution heat exchanger, a third solution heat exchanger and a fourth solution heat exchanger. The dilute solution pipe of the first absorber communicates with the third absorber via the first solution pump and the first solution heat exchanger. The dilute solution pipe of the third absorber communicates with the second absorber via the second solution pump and the second solution heat exchanger. The dilute solution pipe of the second absorber communicates with the fourth absorber via the third solution pump 18. The dilute solution pipe of the fourth absorber communicates with the first generator via the third solution pump and the fourth solution heat exchanger. The concentrated solution pipe of the fourth generator communicates with the second generator via the fourth solution pump and the third solution heat exchanger. The concentrated solution pipe of the second generator communicates with the third generator via the second solution heat exchanger. The concentrated solution pipe of the third generator communicates with the first absorber via the first solution heat exchanger. The refrigerant vapor channel of the first generator communicates with the condenser. The refrigerant vapor channel of the second generator communicates with the second absorber. The refrigerant vapor channel of the third generator communicates with the third absorber. The refrigerant vapor channel of the fourth generator communicates with the fourth absorber. The refrigerant liquid pipe of the condenser communicates with the evaporator via the throttle valve. The refrigerant vapor channel of the evaporator communicates with the first absorber. The thermal driving medium pipes of the first generator, the second generator and the third generator communicate with the external respectively. The waste heat medium pipes of the fourth generator and the evaporator communicate with the external respectively. The heated medium pipes of the first absorber, the second absorber, the third absorber and the condenser communicate with the external respectively. The cooling medium pipe of the fourth absorber communicates with the external. The sectional regenerative third-type absorption heat pump is thereby formed.

6. The sectional regenerative third-type absorption heat pump, in the sectional regenerative third-type absorption heat pump of claim 1, further adds with a new generator, a new throttle valve and a new solution heat exchanger. The concentrated solution pipe of the fourth generator communicates with the first generator via the third solution pump, the third solution heat exchanger and the fourth solution heat exchanger is adjusted for that the concentrated solution pipe of the fourth generator flows through the third solution pump and the third solution heat exchanger and then respectively communicates with the first generator and the new generator via the fourth solution heat exchanger and new solution heat exchanger. The concentrated solution pipe of the new generator communicates with the second generator via the new solution heat exchanger. The refrigerant vapor channel of the generator communicates with the condenser is adjusted for that the refrigerant vapor channel of the generator communicates with the new generator and then the refrigerant liquid channel of the new generator communicates with the condenser via the new throttle valve. The refrigerant vapor channel of the new generator communicates with the condenser. The sectional regenerative third-type absorption heat pump is thereby formed.

7. The sectional regenerative third-type absorption heat pump, in the sectional regenerative third-type absorption heat pump of claim 1, further adds with a new generator, a new throttle valve and a new solution heat exchanger. The concentrated solution pipe of the fourth generator communicates with the first generator via the third solution pump, the third solution heat exchanger and the fourth solution heat exchanger is adjusted for that the concentrated solution pipe of the fourth generator communicates with the first generator via the third solution pump, the third solution heat exchanger, the fourth solution heat exchanger and the new solution heat exchanger. The concentrated solution pipe of the first generator communicates with the second generator via the fourth solution exchanger 19 is adjusted for that the concentrated solution pipe of the first generator communicates with the new generator via the new solution heat exchanger. The concentrated solution pipe of the new generator communicates with the second generator via the fourth solution heat exchanger. The refrigerant vapor channel of the generator communicates with the condenser is adjusted for that the refrigerant vapor channel of the generator communicates with the new generator. The refrigerant liquid channel of the new generator communicates with the condenser via the new throttle valve. The refrigerant vapor channel of the new generator communicates with the condenser. The sectional regenerative third-type absorption heat pump is thereby formed 8. The sectional regenerative third-type absorption heat pump, in the sectional regenerative third-type absorption heat pump of claim 1, further adds with a new generator, a new throttle valve, a new solution heat exchanger and a new solution pump. The concentrated solution pipe of the fourth generator communicates with the first generator via the third solution pump, the third solution heat exchanger and the fourth solution heat exchanger is adjusted for that the concentrated solution pipe of the fourth generator communicates with the new generator via the third solution pump, the third solution heat exchanger and the fourth solution heat exchanger. The concentrated solution pipe of the new generator communicates with the first generator via the new solution pump and the new solution heat exchanger. The concentrated solution pipe of the first generator communicates with the second generator via the fourth solution heat exchanger is adjusted for that the concentrated solution pipe of the first generator communicates with the second generator via the new solution heat exchanger and the fourth solution heat exchanger. The refrigerant vapor channel of the generator communicates with the condenser is adjusted for that the refrigerant vapor channel of the generator communicates with the new generator. The refrigerant liquid channel of the new generator communicates with the condenser via the new throttle valve. The refrigerant vapor channel of the new generator communicates with the condenser. The sectional regenerative third-type absorption heat pump is thereby formed 9. The sectional regenerative third-type absorption heat pump, in the sectional regenerative third-type absorption heat pump of claim 2, further adds with a new generator, a new throttle valve and a new solution heat exchanger. The dilute solution pipe of the third solution pump communicates with the first generator via the third solution heat exchanger and the fourth solution heat exchanger is adjusted for that the dilute solution pipe of the third solution pump flows through the third solution heat exchanger, respectively communicating with the first generator and the new generator via the fourth solution heat exchanger and new solution heat exchanger. The refrigerant vapor channel of the generator communicates with the condenser is adjusted for that the refrigerant vapor channel of the generator communicates with the new generator. The refrigerant liquid channel of the new generator communicates with the condenser via the new throttle valve. The refrigerant vapor channel of the new generator communicates with the condenser. The sectional regenerative third-type absorption heat pump is thereby formed.

10. The sectional regenerative third-type absorption heat pump, in the sectional regenerative third-type absorption heat pump of claim 2, further adds with a new generator, a new throttle valve and a new solution heat exchanger. The dilute solution pipe of the third solution pump communicates with the first generator via the third solution heat exchanger and the fourth solution heat exchanger is adjusted for that the dilute solution pipe of the third solution pump communicates with the first generator via the third solution heat exchanger, the fourth solution heat exchanger and new solution heat exchanger. The concentrated solution pipe of the first generator communicates with the fourth generator via the fourth solution heat exchanger is adjusted for that the dilute solution pipe of the first generator communicates with the new generator via the new solution heat exchanger. The concentrated solution pipe of the new generator communicates with the fourth generator via the fourth solution heat exchanger. The refrigerant vapor channel of the generator communicates with the condenser is adjusted for that the refrigerant vapor channel of the generator communicates with the new generator. The refrigerant liquid channel of the new generator communicates with the condenser via the new throttle valve. The refrigerant vapor channel of the new generator communicates with the condenser. The sectional regenerative third-type absorption heat pump is thereby formed.

11. The sectional regenerative third-type absorption heat pump, in the sectional regenerative third-type absorption heat pump of claim 2, further adds with a new generator, a new throttle valve, a new solution heat exchanger and a new solution pump. The dilute solution pipe of the third solution pump communicates with the first generator via the third solution heat exchanger and the fourth solution heat exchanger is adjusted for that the dilute solution pipe of the third solution pump communicates with the new generator via the third solution heat exchanger and the fourth solution heat exchanger. The concentrated solution pipe of the new generator communicates with the first generator via the new solution pump and the new solution heat exchanger. The concentrated solution pipe of the first generator communicates with the fourth generator via the fourth solution heat exchanger is adjusted for that the refrigerant vapor channel of the first generator communicates with the fourth generator via new solution heat exchanger and the fourth solution heat exchanger. The refrigerant vapor channel of the new generator communicates with the condenser is adjusted for that the refrigerant vapor channel of the first generator communicates with the new generator. The refrigerant liquid channel of the new generator communicates with the condenser via the new throttle valve. The refrigerant vapor channel of the new generator communicates with the condenser. The new sectional regenerative third-type absorption heat pump is thereby formed.

12. The sectional regenerative third-type absorption heat pump, in the sectional regenerative third-type absorption heat pump of claims 3 to 4, further adds with a new generator, a new throttle valve and a new solution heat exchanger. The dilute solution pipe of the third solution pump communicates with the new generator via the new solution heat exchanger. The concentrated solution pipe of the new generator communicates with the second generator via the new solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

13. The sectional regenerative third-type absorption heat pump, in the sectional regenerative third-type absorption heat pump of claims 3 to 4, further adds with a new generator, a new throttle valve and a new solution heat exchanger. The dilute solution pipe of the third solution pump communicates with the first generator via the third solution heat exchanger is adjusted for that the dilute solution pipe of the third solution pump communicates with the first generator via the third solution heat exchanger and the new solution heat exchanger. The concentrated solution pipe of the first generator communicates with the second generator via the third solution heat exchanger is adjust for that the concentrated solution pipe of the first generator communicates with the new generator via the new solution heat exchanger. The concentrated solution pipe of the new generator communicates with the second generator via the third solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

14. The sectional regenerative third-type absorption heat pump, in the sectional regenerative third-type absorption heat pump of claims 3 to 4, further adds with a new generator, a new throttle, a new solution heat exchanger and a new solution pump. The dilute solution pipe of the third solution pump communicates with the first generator via the third solution heat exchanger is adjusted for that the dilute solution pipe of the third solution pump communicates with the new generator via the third solution heat exchanger. The concentrated solution pipe of the new generator communicates with the second generator via the third solution heat exchanger is adjust for that the concentrated solution pipe of the first generator communicates with the second generator via the new solution heat exchanger and the third solution heat exchanger. The concentrated solution pipe of the first generator communicates with the second generator via the third solution heat exchanger is adjusted for that the concentrated solution pipe of the first generator communicates with the second generator via the new solution heat exchanger and the third solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

15. The sectional regenerative third-type absorption heat pump, in the sectional regenerative third-type absorption heat pump of claim 5, further adds with a new generator, a new throttle valve and a new solution heat exchanger. The dilute solution pipe of the third solution pump communicates with the new generator via the new solution heat exchanger. The concentrated solution pipe of the new generator communicates with the fourth generator via the new solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

16. The sectional regenerative third-type absorption heat pump, in the sectional regenerative third-type absorption heat pump of claim 5, further adds with a new generator, a new throttle valve and a new solution heat exchanger. The dilute solution pipe of the third solution pump communicates with the first generator via the fourth solution heat exchanger is adjusted for that the dilute solution pipe of the third solution pump communicates with the first generator via the fourth solution heat exchanger and the new solution heat exchanger. The concentrated solution pipe of the first generator communicates with the fourth generator via the fourth solution heat exchanger is adjust for that the concentrated solution pipe of the first generator communicates with the new generator via the new solution heat exchanger. The concentrated solution pipe of the new generator communicates with the fourth generator via the fourth solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

17. The sectional regenerative third-type absorption heat pump, in the sectional regenerative third-type absorption heat pump of claim 5, further adds with a new generator, a new throttle, a new solution heat exchanger and a new solution pump. The dilute solution pipe of the third solution pump communicates with the first generator via the fourth solution heat exchanger is adjusted for that the dilute solution pipe of the third solution pump communicates with the new generator via the fourth solution heat exchanger. The concentrated solution pipe of the new generator communicates with the first generator via the new solution pump and the new solution heat exchanger. The concentrated solution pipe of the first generator communicates with the fourth generator via the fourth solution heat exchanger is adjusted for that the concentrated solution pipe of the first generator communicates with the fourth generator via the new solution heat exchanger and the fourth solution heat exchanger. The refrigerant vapor channel of the first generator communicates with the condenser is adjusted for that the refrigerant vapor channel of the first generator communicates with the new generator and then the refrigerant liquid channel of the new generator communicates with the condenser via the new throttle. The refrigerant vapor channel of the new generator communicates with the condenser. The sectional regenerative third-type absorption heat pump is thereby formed.

The sectional regenerative third-type absorption heat pump shown in FIG. 4 is taking for example to explain the invention.

The sectional regenerative third-type absorption heat pump shown in FIG. 4 is thereby formed. The first generator provides the refrigerant vapor to condenser 8, second generator 2 and second absorber 6, third generator and the third absorber 7 form the regenerative heating of driving heat medium respectively. The fourth generator 4 and the fourth absorber 21 form the regenerative heating of the waste heat. Its effect can be seen as following:

(1) It can be achieved the multi-terminal heat supply of the heated medium and satisfy the large temperature difference heating for the heated medium and have a reasonable thermodynamics perfect degree to improve the utilization of waste heat resources.

(2) It can adjust the heat load of the high temperature heating port and in some range to realize the continuous and rationalization of the coefficient of performance.

(3) Jointly adopting the first generator 1, second generator 2 and the third generator 3 to achieve the generation process of the solution is benefit to use the driving heat load deeply and benefit to use high temperature heat resource comprehensively. It can achieve the effective utilization of heat transfer temperature difference and improve the utilization ratio of high temperature driving heat.

(4) The second generator 2 and the second absorber 6, the third generator 3 and the third absorber 7 form the sectional regenerative process respectively, the regenerative load without restrict by the other processes can collect and use the difference temperature and quantity of the high temperature resource to improve the utilization ratio of waste heat.

(5) The fourth generator 4 and the fourth absorber 21 form the regenerative process and combine the evaporator to utilize the waste heat. It can full use the temperature difference of the waste heat and cooling medium to realize the depth utilization of the waste heat resources.

In the figures, 1—the first generator, 2—the second generator, 3—the third generator, 4—the fourth generator, 5—the first absorber, 6—the second absorber, 7—the third absorber, 8—the condenser, 9—the second condenser, 10—the evaporator, 11—the throttle, 12—the refrigerant liquid pump, 13—the first solution pump, 14—the second solution pump, 15—the third solution pump, 16—the first solution heat exchanger, 17—the second solution heat exchanger, 18—the third solution heat exchanger, 19—the fourth solution heat exchanger, 20—the fourth solution pump, 21—the fourth absorber, A—the new generator, B—the new throttle, C—the new solution heat exchanger, E—the new solution pump.

DETAILED DESCRIPTION

What needs to explain firstly is that the structure and process on the expression is not necessary to repeat. For the obvious progresses, they will not be expressed. The detailed description of the invention combined with the attached drawings and examples is as follows.

Figure 1:
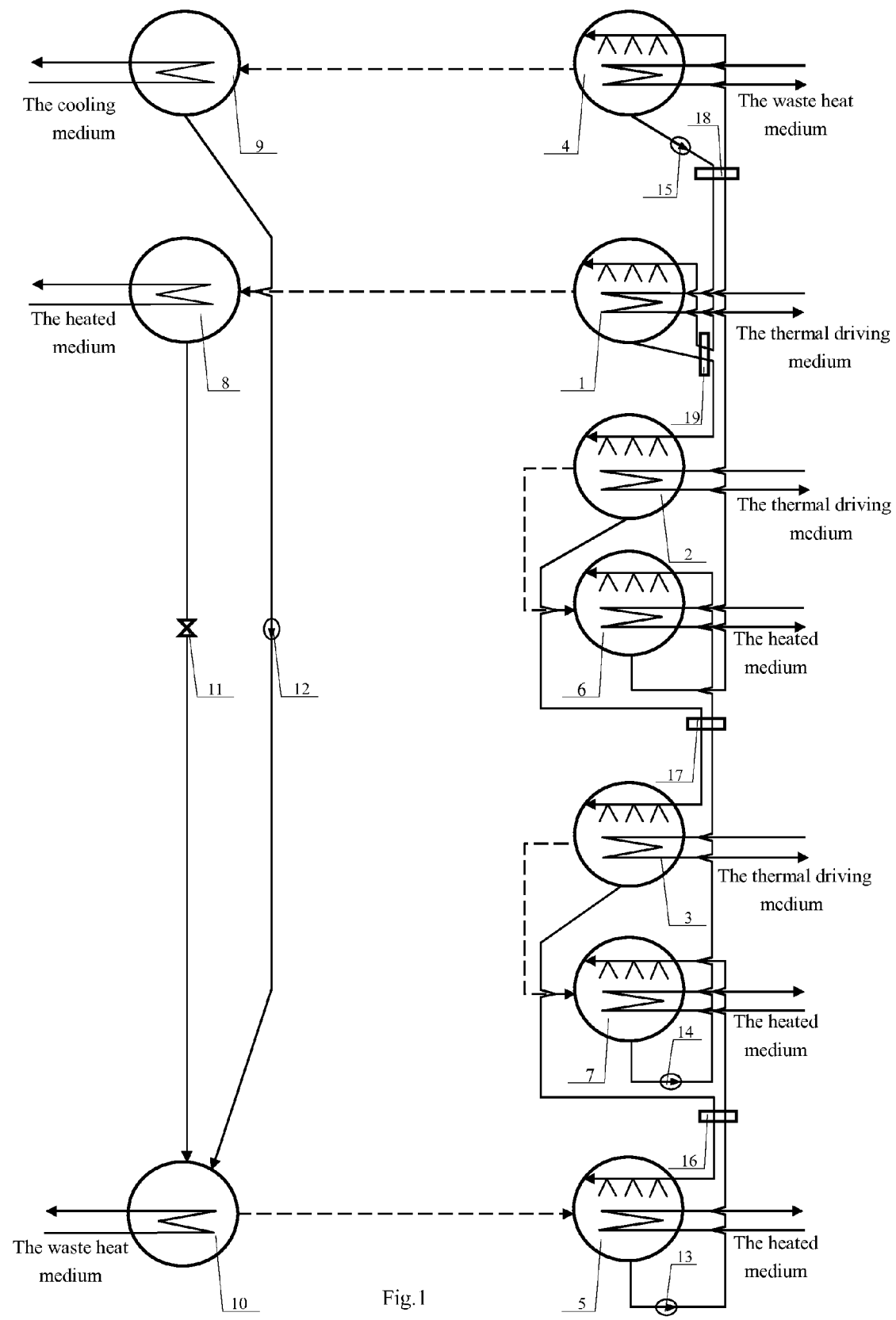
FIG. 1 is the first structure and flow diagram of the sectional regenerative third-type absorption heat pump.

The sectional regenerative third-type absorption heat pump shown in FIG. 1 can be realized in the following manner:

Structurally, it mainly comprises a first generator 1, a second generator 2, a third generator 3, a fourth generator 4, a first absorber 5, a second absorber 6, a third absorber 7, a condenser 8, a second condenser 9, an evaporator 10, a throttle valve 11, a refrigerant liquid pump 12, a first solution pump, a second solution pump 14, a first solution heat exchanger 16, a second solution heat exchanger 17, a third solution heat exchanger 18 and a fourth solution heat exchanger 19. The dilute solution pipe of the first absorber 5 communicates with the third absorber 7 via the first solution pump 13 and the first solution heat exchanger 16. The dilute solution pipe of the third absorber 7 communicates with the second absorber 6 via the second solution pump 14 and the second solution heat exchanger 17. The dilute solution pipe of the second absorber 6 communicates with the fourth generator 4 via the third solution heat exchanger 18. The concentrated solution pipe of the fourth generator 4 communicates with the first generator 1 via the third solution pump 15, the third solution heat exchanger 18 and the fourth solution heat exchanger 19. The concentrated solution pipe of the second generator 2 communicates with the third generator 3 via the second solution heat exchanger 17. The concentrated solution pipe of the third generator 3 communicates with the first absorber 5 via the first solution heat exchanger 16. The refrigerant vapor channel of the first generator 1 communicates with the condenser 8. The refrigerant vapor channel of the second generator 2 communicates with the second absorber 6. The refrigerant vapor channel of the third generator 3 communicates with the third absorber 7. The refrigerant vapor channel of the fourth generator 4 communicates with the second condenser 9. The refrigerant liquid pipe of the condenser 8 communicates with the evaporator 10 via the throttle valve 11. The refrigerant liquid pipe of the second condenser 9 communicates with the evaporator 10 via the refrigerant liquid pump 12. The thermal driving medium pipes of the first generator 1, the second generator 2 and the third generator 3 respectively communicate with the external. The waste heat medium pipes of the fourth generator 4 and the evaporator 10 communicates with the external respectively. The heated medium pipes of the first absorber 5, the second absorber 6, the third absorber 7 and the condenser 8 respectively communicate with the external. The cooling medium pipe of the second condenser 9 communicates with the external.

Procedurally, the dilute solution of the first absorber 5 flows through the first solution pump 13 and the first solution heat exchanger 16 into the third absorber 7 in which it absorbs the refrigerant vapor and releases the heat to the heated medium. The dilute solution of the third absorber 7 flows through the second solution pump 14 and the second solution heat exchanger 17 into the second absorber 6 in which it absorbs the refrigerant vapor and releases the heat to the heated medium. The dilute solution of the second absorber 6 flows through the third solution heat exchanger 18 into the fourth generator 4. The waste heat medium flows through the fourth generator 4 in which it heats the internal solution and releases the refrigerant vapor provided for the second condenser 9. The concentrated solution of the fourth generator 4 flows through the third solution pump 15, the third solution heat exchanger 18 and the fourth solution heat exchanger 19 into the first generator 1. The thermal driving medium flows through the first generator 1 in which it heats the internal solution and releases the refrigerant vapor provided for the condenser 8. The concentrated solution of the first generator 1 flows through the fourth solution heat exchanger 19 into the second generator 2. The thermal driving medium flows through the second generator 2 in which it heats the internal solution and releases the refrigerant vapor provided for the second absorber 6. The concentrated solution of the second generator 2 flows through the second solution heat exchanger 17 into the third generator 3. The thermal driving medium flows through the third generator 3 in which it heats the internal solution and releases the refrigerant vapor provided for the third absorber 7. The concentrated solution of the third generator 3 flows through the first solution heat exchanger 16 into the first absorber 5 in which it absorbs the refrigerant vapor and releases heat to the heated medium. The refrigerant vapor of the condenser 8 releases the heat to the heated medium and becomes the refrigerant liquid which enters the evaporator 10 via the throttle valve 11. The refrigerant vapor of the second condenser 9 releases the heat to the cooling medium and becomes the refrigerant liquid which enters the evaporator 10 after been lifted pressure via the refrigerant liquid pump 12. The waste heat medium flows through the evaporator 10 in which it heats the internal refrigerant liquid and the refrigerant liquid becomes the refrigerant vapor provided for the first absorber 5. The sectional regenerative third-type absorption heat pump is thereby formed.

Figure 2:
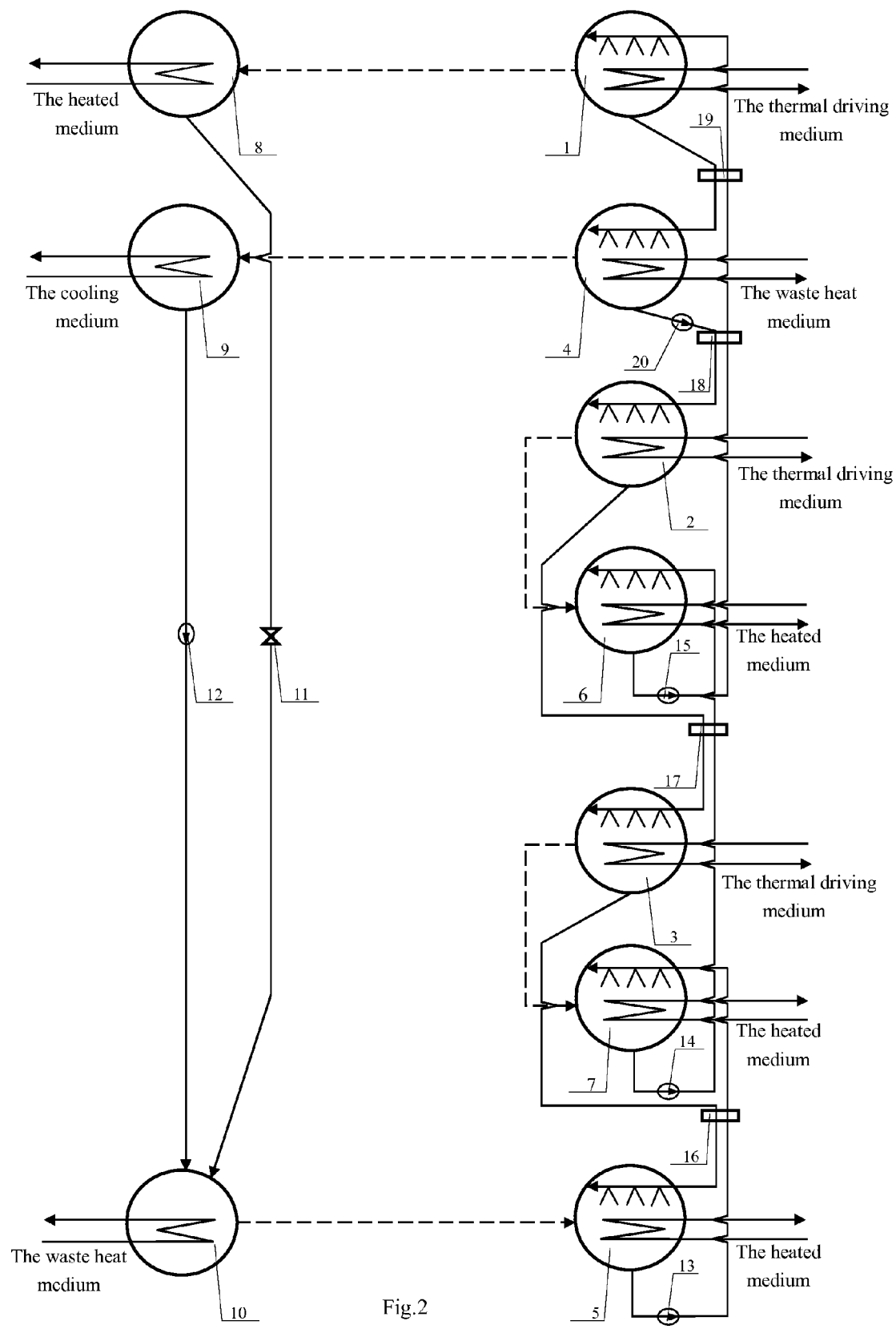
FIG. 2 is the second structure and flow diagram of the sectional regenerative third-type absorption heat pump.

The sectional regenerative third-type absorption heat pump shown in FIG. 2 can be realized in the following manner:

Structurally, it mainly comprises a first generator 1, a second generator 2, a third generator 3, a fourth generator 4, a first absorber 5, a second absorber 6, a third absorber 7, a condenser 8, a second condenser 9, an evaporator 10, a throttle valve 11, a refrigerant liquid pump 12, a first solution pump 13, a second solution pump 14, a first solution heat exchanger 16, a second solution heat exchanger 17, a third solution heat exchanger 18 and a fourth solution heat exchanger 19. The dilute solution pipe of the first absorber 5 communicates with the third absorber 7 via the first solution pump 13 and the first solution heat exchanger 16. The dilute solution pipe of the third absorber 7 communicates with the second absorber 6 via the second solution pump 14 and the second solution heat exchanger 17. The dilute solution pipe of the second absorber 6 communicates with the first generator 1 via the third solution pump 15, the third solution heat exchanger 18 and the fourth solution heat exchanger 19. The concentrated solution pipe of the first generator 1 communicates with the fourth generator 4 via the fourth solution heat exchanger 19. The concentrated solution pipe of the fourth generator 4 communicates with the second generator 2 via the fourth solution pump 20 and the third solution heat exchanger 18. The concentrated solution pipe of the second generator 2 communicates with the third generator 3 via the second solution heat exchanger 17. The concentrated solution pipe of the third generator 3 communicates with the first absorber 5 via the first solution heat exchanger 16. The refrigerant vapor channel of the first generator 1 communicates with the condenser 8. The refrigerant vapor channel of the second generator 2 communicates with the second absorber 6. The refrigerant vapor channel of the third generator 3 communicates with the third absorber 7. The refrigerant vapor channel of the fourth generator 4 communicates with the second condenser 9. The refrigerant liquid pipe of the condenser 8 communicates with the evaporator 10 via the throttle valve 11. The refrigerant liquid pipe of the second condenser 9 communicates with the evaporator 10 via the refrigerant liquid pump 12. The refrigerant vapor channel of the evaporator 10 communicates with the first absorber 5. The thermal driving medium pipe of the first generator 1, the second generator 2 and the third generator 3 respectively communicates with the external. The waste heat medium pipe of the fourth generator 4 and the evaporator 10 respectively communicates with the external. The heated medium pipe of the first absorber 5, the second absorber 6, the third absorber 7 and the condenser 8 respectively communicates with the external. The cooling medium pipe of the second condenser 9 communicates with the external.

Procedurally, the dilute solution of the first absorber 5 flows through the first solution pump 13 and the first solution heat exchanger 16 into the third absorber 7 in which it absorbs the refrigerant vapor and releases the heat to the heated medium. The dilute solution of the third absorber 7 flows through the second solution pump 14 and the second solution heat exchanger 17 into the second absorber 6 in which it absorbs the refrigerant vapor and releases the heat to the heated medium. The dilute solution of the second absorber 6 flows through the third solution pump 15, the third solution heat exchanger 18 and the fourth solution heat exchanger 19 into the first generator 1. The thermal driving medium flows through the first generator 1 in which it heats the internal solution and releases the refrigerant vapor provided for the condenser 8. The concentrated solution of the first generator 1 flows through the fourth solution heat exchanger 19 into the fourth generator 4. The waste heat medium flows through the fourth generator 4 in which it heats the internal solution and releases the refrigerant vapor provided for the second condenser 9. The concentrated solution of the fourth generator 4 flows through the fourth solution pump 20 and the third solution heat exchanger 18 into the second generator 2. The thermal driving medium flows through the second generator 2 in which it heats the internal solution and releases the refrigerant vapor provided for the second absorber 6. The concentrated solution of the second generator 2 flows through the second solution heat exchanger 17 into the third generator 3. The thermal driving medium flows through the third generator 3 in which it heats the internal solution and releases the refrigerant vapor provided for the third absorber 7. The concentrated solution of the third generator 3 flows through the first solution heat exchanger 16 into the first absorber 5 in which it absorbs the refrigerant vapor and releases heat to the heated medium. The refrigerant vapor of the condenser 8 releases the heat to the heated medium and becomes the refrigerant liquid which enters the evaporator 10 via the throttle valve 11. The refrigerant vapor of the second condenser 9 releases the heat to the cooling medium and becomes the refrigerant liquid which enters the evaporator 10 after been lifted pressure via the refrigerant liquid pump 12. The waste heat medium flows through the evaporator 10 in which it heats the internal refrigerant liquid and the refrigerant liquid becomes the refrigerant vapor provided for the first absorber 5. The sectional regenerative third-type absorption heat pump is thereby formed.

Figure 3:
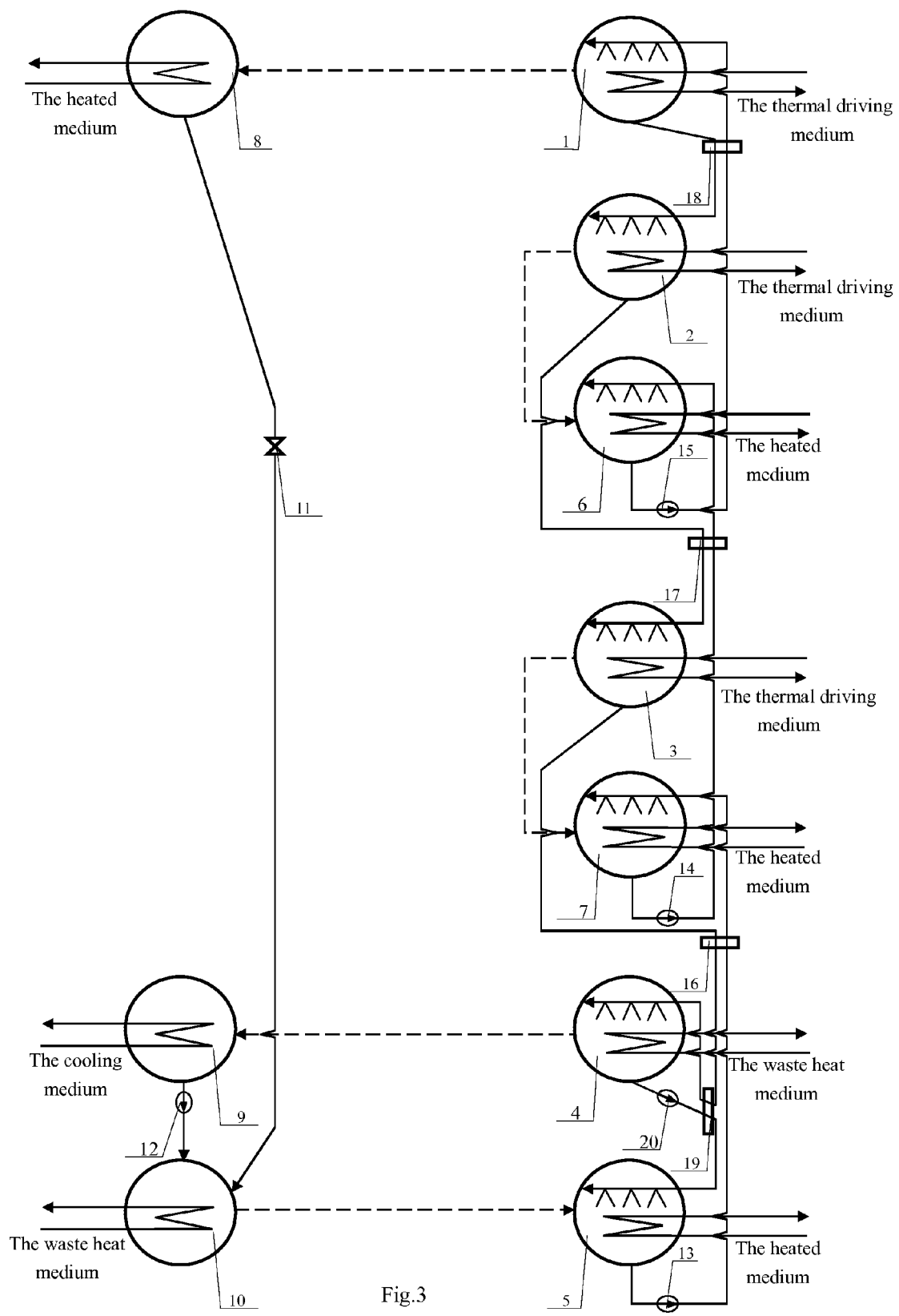
FIG. 3 is the third structure and flow diagram of the sectional regenerative third-type absorption heat pump.

The sectional regenerative third-type absorption heat pump shown in FIG. 3 can be realized in the following manner:

Structurally, it mainly comprises a first generator 1, a second generator 2, a third generator 3, a fourth generator 4, a first absorber 5, a second absorber 6, a third absorber 7, a condenser 8, a second condenser 9, an evaporator 10, a throttle valve 11, a refrigerant liquid pump 12, a first solution pump 13, a second solution pump 14, a first solution heat exchanger 16, a second solution heat exchanger 17, a third solution heat exchanger 18 and a fourth solution heat exchanger 19. The dilute solution pipe of the first absorber 5 communicates with the third absorber 7 via the first solution pump 13 and the first solution heat exchanger 16. The dilute solution pipe of the third absorber 7 communicates with the second absorber 6 via the second solution pump 14 and the second solution heat exchanger 17. The dilute solution pipe of the second absorber 6 communicates with the first generator 1 via the third solution pump 15 and the third solution heat exchanger 18. The concentrated solution pipe of the first generator 1 communicates with the second generator 2 via the third solution heat exchanger 18. The concentrated solution pipe of the first generator 1 communicates with the second generator 2 via the third solution heat exchanger 18. The concentrated solution pipe of the second generator 2 communicates with the third generator 3 via the second solution heat exchanger 17. The concentrated solution pipe of the third generator 3 communicates with the fourth generator 4 via the first solution heat exchanger 16 and the fourth solution heat exchanger 19. The concentrated solution pipe of the fourth generator 4 communicates with the first absorber 5 via the fourth solution pump 20 and the fourth solution heat exchanger 19. The refrigerant vapor channel of the first generator 1 communicates with the condenser 8. The refrigerant vapor channel of the second generator 2 communicates with the second absorber 6. The refrigerant vapor channel of the third generator 3 communicates with the third absorber 7. The refrigerant vapor channel of the fourth generator 4 communicates with the second condenser 9. The refrigerant liquid pipe of the condenser 8 communicates with the evaporator 10 via the throttle valve 11. The refrigerant liquid pipe of the second condenser 9 communicates with the evaporator 10 via the refrigerant liquid pump 12. The refrigerant vapor channel of the evaporator 10 communicates with the first absorber 5. The thermal driving medium pipe of the first generator 1, the second generator 2 and the third generator 3 respectively communicates with the external. The waste heat medium pipe of the fourth generator 4 and the evaporator 10 respectively communicates with the external. The heated medium pipe of the first absorber 5, the second absorber 6, the third absorber 7 and the condenser 8 respectively communicates with the external. The cooling medium pipe of the second condenser 9 communicates with the external.

Procedurally, the dilute solution of the first absorber 5 flows through the first solution pump 13 and the first solution heat exchanger 16 into the third absorber 7 in which it absorbs the refrigerant vapor and releases the heat to the heated medium. The dilute solution of the third absorber 7 flows through the second solution pump 14 and the second solution heat exchanger 17 into the second absorber 6 in which it absorbs the refrigerant vapor and releases the heat to the heated medium. The dilute solution of the second absorber 6 flows through the third solution pump 15 and the third solution heat exchanger 18 into the first generator 1. The thermal driving medium flows through the first generator 1 in which it heats the internal solution and releases the refrigerant vapor provided for the condenser 8. The concentrated solution of the first generator 1 flows through the third solution heat exchanger 18 into the second generator 2. The thermal driving medium flows through the second generator 2 in which it heats the internal solution and releases the refrigerant vapor provided for the second absorber 6. The concentrated solution of the second generator 2 flows through the second solution heat exchanger 17 into the third generator 3. The thermal driving medium flows through the third generator 3 in which it heats the internal solution and releases the refrigerant vapor provided for the third absorber 7. The concentrated solution of the third generator 3 flows through the first solution heat exchanger 16 and the fourth solution heat exchanger 19 into the fourth generator 4. The waste heat medium flows through the fourth generator 4 in which it heats the internal solution and releases the refrigerant vapor provided for the second condenser 9. The concentrated solution of the fourth generator 4 flows through the fourth solution pump 20 and the fourth solution heat exchanger 19 into the first absorber 5 in which it absorbs the refrigerant vapor and releases heat to the heated medium. The refrigerant vapor of the condenser 8 releases the heat to the heated medium and becomes the refrigerant liquid which enters the evaporator 10 via the throttle valve 11. The refrigerant vapor of the second condenser 9 releases the heat to the cooling medium and becomes the refrigerant liquid which enters the evaporator 10 after been lifted pressure via the refrigerant liquid pump 12. The waste heat medium flows through the evaporator 10 in which it heats the internal refrigerant liquid and the refrigerant liquid becomes the refrigerant vapor provided for the first absorber 5. The sectional regenerative third-type absorption heat pump is thereby formed.

Figure 4:
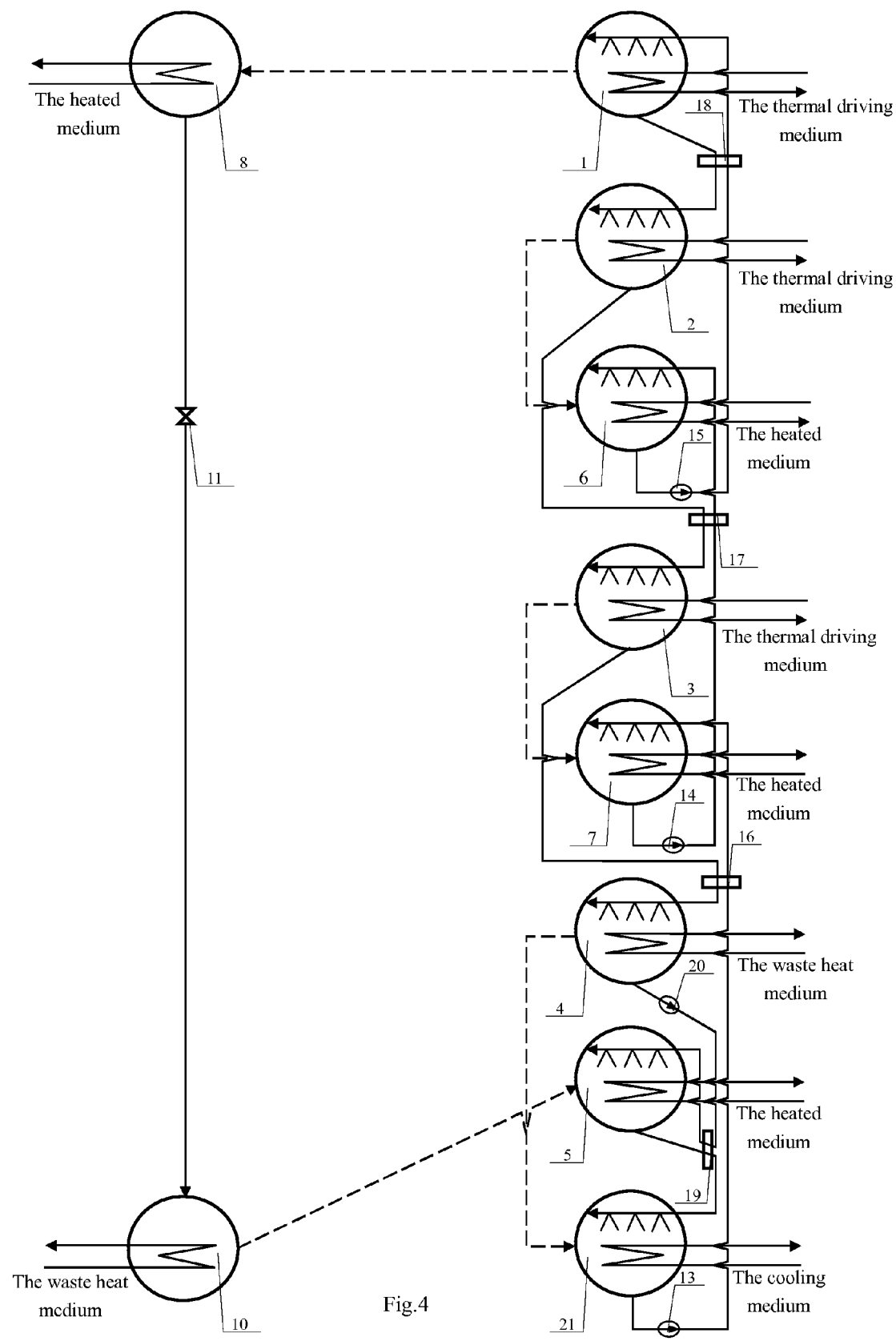
FIG. 4 is the fourth structure and flow diagram of the sectional regenerative third-type absorption heat pump.

The sectional regenerative third-type absorption heat pump shown in FIG. 4 can be realized in the following manner:

Structurally, it mainly comprises a first generator 1, a second generator 2, a third generator 3, a fourth generator 4, a first absorber 5, a second absorber 6, a third absorber 7, a fourth absorber 21, a condenser 8, an evaporator 10, a throttle valve 11, a first solution pump 13, a second solution pump 14, a third solution pump 14, a fourth solution pump 14, a first solution heat exchanger 16, a second solution heat exchanger 17, a third solution heat exchanger 18 and a fourth solution heat exchanger 19. The dilute solution pipe of the fourth absorber 21 communicates with the third absorber 7 via the first solution pump 13 and the second solution heat exchanger 17. The dilute solution pipe of the third absorber 7 communicates with the second absorber 6 via the second solution pump 14 and the second solution heat exchanger 17. The dilute solution pipe of the second absorber 6 communicates with the first generator 1 via the third solution pump 15 and the third solution heat exchanger 18. The concentrated solution pipe of the first generator 1 communicates with the second generator 2 via the third solution heat exchanger 18. The concentrated solution pipe of the second generator 2 communicates with the third generator 3 via the second solution heat exchanger 17. The concentrated solution pipe of the third generator 3 communicates with the fourth generator 4 via the first solution heat exchanger 16. The concentrated solution pipe of the fourth generator 4 communicates with the first absorber 5 via the fourth solution pump 20 and the fourth solution heat exchanger 19. The refrigerant vapor channel of the first generator 1 communicates with the condenser 8. The refrigerant vapor channel of the second generator 2 communicates with the second absorber 6. The refrigerant vapor channel of the third generator 3 communicates with the third absorber 7. The refrigerant vapor channel of the fourth generator 4 communicates with the fourth absorber 21. The refrigerant liquid pipe of the condenser 8 communicates with the evaporator 10 via the throttle valve 11. The refrigerant vapor channel of the evaporator 10 communicates with the first absorber 5. The thermal driving medium pipe of the first generator 1, the second generator 2 and the third generator 3 respectively communicates with the external. The waste heat medium pipe of the fourth generator 4 and the evaporator 10 respectively communicates with the external. The heated medium pipe of the first absorber 5, the second absorber 6, the third absorber 7 and the condenser 8 respectively communicates with the external. The cooling medium pipe of the fourth absorber 21 communicates with the external.

Procedurally, the dilute solution of the fourth absorber 21 flows through the first solution pump 13 and the first solution heat exchanger 16 into the third absorber 7 in which it absorbs the refrigerant vapor and releases the heat to the heated medium. The dilute solution of the third absorber 7 flows through the second solution pump 14 and the second solution heat exchanger 17 into the second absorber 6 in which it absorbs the refrigerant vapor and releases the heat to the heated medium. The dilute solution of the second absorber 6 flows through the third solution pump 15 and the third solution heat exchanger 18 into the first generator 1. The thermal driving medium flows through the first generator 1 in which it heats the internal solution and releases the refrigerant vapor provided for the condenser 8. The concentrated solution of the first generator 1 flows through the third solution heat exchanger 18 into the second generator 2. The thermal driving medium flows through the second generator 2 in which it heats the internal solution and releases the refrigerant vapor provided for the second absorber 6. The concentrated solution of the second generator 2 flows through the second solution heat exchanger 17 into the third generator 3. The thermal driving medium flows through the third generator 3 in which it heats the internal solution and releases the refrigerant vapor provided for the third absorber 7. The concentrated solution of the third generator 3 flows through the first solution heat exchanger 16 into the fourth generator 4. The waste heat medium flows through the fourth generator 4 in which it heats the internal solution and releases the refrigerant vapor provided for the fourth absorber 21. The concentrated solution of the fourth generator 4 flows through the fourth solution pump 20 and the fourth solution heat exchanger 19 into the first absorber 5 in which it absorbs the refrigerant vapor and releases heat to the heated medium. The dilute solution of the first absorber 5 flows through the fourth solution heat exchanger 19 into the fourth absorber 21 in which it absorbs the refrigerant vapor and releases heat to the cooling medium. The refrigerant vapor of the condenser 8 releases the heat to the heated medium and becomes the refrigerant liquid. The refrigerant liquid flows through the throttle valve 11 and enters the evaporator 10 in which it absorbs waste heat and becomes the refrigerant vapor provided for the first absorber 5. The sectional regenerative third-type absorption heat pump is thereby formed.

Figure 5:
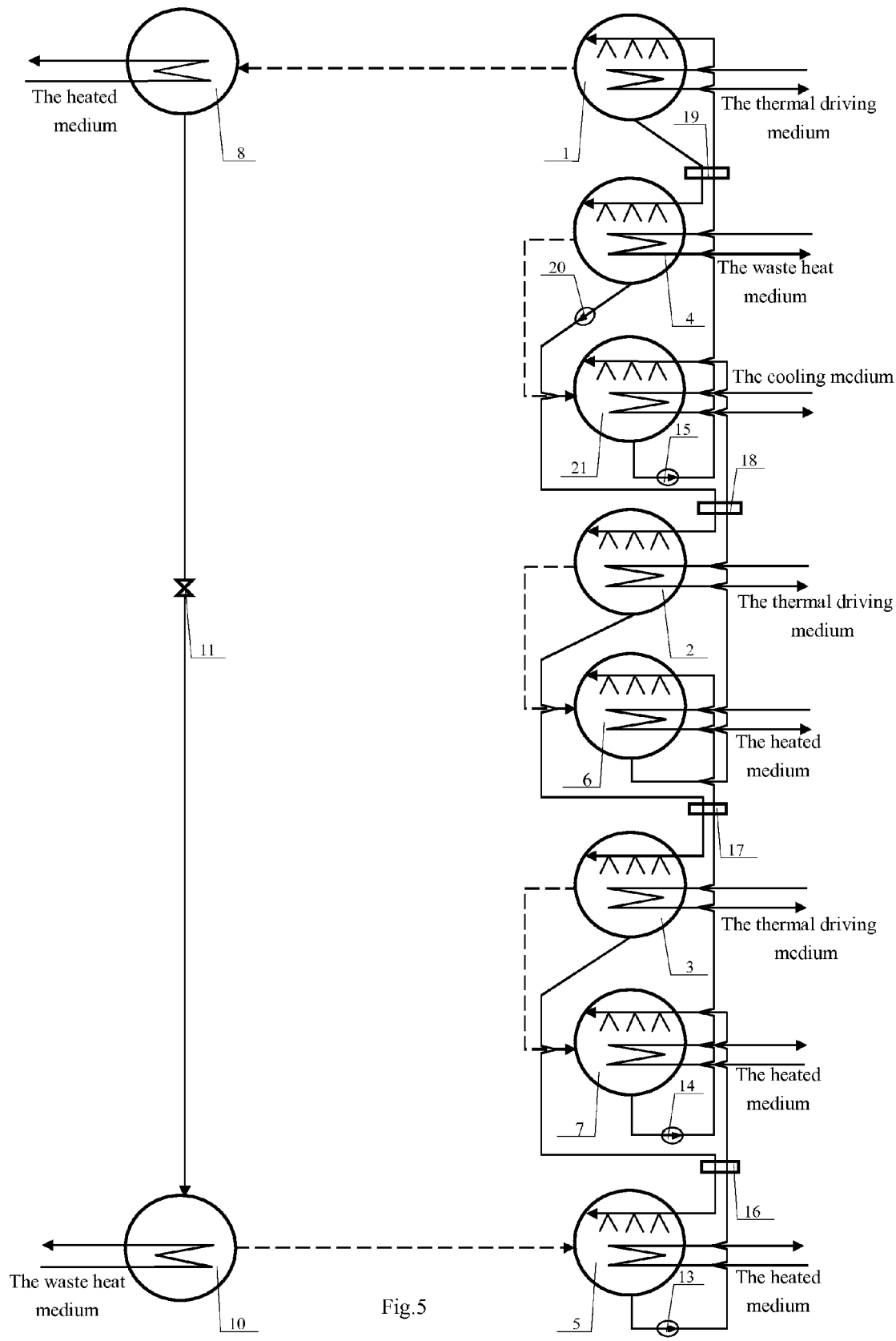
FIG. 5 is the fifth structure and flow diagram of the sectional regenerative third-type absorption heat pump.

The sectional regenerative third-type absorption heat pump shown in FIG. 5 can be realized in the following manner:

Structurally, it mainly comprises a first generator 1, a second generator 2, a third generator 3, a fourth generator 4, a first absorber 5, a second absorber 6, a third absorber 7, a fourth absorber 21, a condenser 8, an evaporator 10, a throttle valve 11, a first solution pump 13, a second solution pump 14, a third solution pump 14, a fourth solution pump 14, a first solution heat exchanger 16, a second solution heat exchanger 17, a third solution heat exchanger 18 and a fourth solution heat exchanger 19. The dilute solution pipe of the first absorber 5 communicates with the third absorber 7 via the first solution pump 13 and the first solution heat exchanger 16. The dilute solution pipe of the third absorber 7 communicates with the second absorber 6 via the second solution pump 14 and the second solution heat exchanger 17. The dilute solution pipe of the second absorber 6 communicates with the fourth absorber 21 via the third solution pump 18. The dilute solution pipe of the fourth absorber 21 communicates with the first generator 1 via the third solution pump 15 and the fourth solution heat exchanger 19. The concentrated solution pipe of the fourth generator 4 communicates with the second generator 2 via the fourth solution pump 20 and the third solution heat exchanger 18. The concentrated solution pipe of the second generator 2 communicates with the third generator 3 via the second solution heat exchanger 17. The concentrated solution pipe of the third generator 3 communicates with the first absorber 5 via the first solution heat exchanger 16. The refrigerant vapor channel of the first generator 1 communicates with the condenser 8. The refrigerant vapor channel of the second generator 2 communicates with the second absorber 6. The refrigerant vapor channel of the third generator 3 communicates with the third absorber 7. The refrigerant vapor channel of the fourth generator 4 communicates with the fourth absorber 21. The refrigerant liquid pipe of the condenser 8 communicates with the evaporator 10 via the throttle valve 11. The refrigerant vapor channel of the evaporator 10 communicates with the first absorber 5. The thermal driving medium pipe of the first generator 1, the second generator 2 and the third generator 3 respectively communicates with the external. The waste heat medium pipe of the fourth generator 4 and the evaporator 10 respectively communicates with the external. The heated medium pipe of the first absorber 5, the second absorber 6, the third absorber 7 and the condenser 8 respectively communicates with the external. The cooling medium pipe of the fourth absorber 21 communicates with the external.

Procedurally, the dilute solution of the first absorber 5 flows through the first solution pump 13 and the first solution heat exchanger 16 into the third absorber 7 in which it absorbs refrigerant vapor and releases heat to the heated medium. The dilute solution of the third absorber 7 flows through the second solution pump 14 and the second solution heat exchanger 17 into the second absorber 6 in which it absorbs the refrigerant vapor and releases the heat to the heated medium. The dilute solution of the second absorber 6 flows through the third solution heat exchanger 18 into the dilute solution of the fourth absorber 21 in which it absorbs refrigerant vapor and releases heat to the cooling medium. The dilute solution of the fourth absorber 21 flows through the third solution pump 15 and the fourth solution heat exchanger 19 into the first generator 1. The thermal driving medium flows through the first generator 1 in which it heats the internal solution and releases the refrigerant vapor provided for the condenser 8. The concentrated solution of the first generator 1 flows through the fourth solution heat exchanger 19 into the fourth generator 4. The waste heat medium flows through the fourth generator 4 in which it heats the internal solution and releases the refrigerant vapor provided for the fourth absorber 21. The concentrated solution of the fourth generator 4 flows through the fourth solution pump 20 and the third solution heat exchanger 18 into the second generator 2. The thermal driving medium flows through the second generator 2 in which it heats the internal solution and releases the refrigerant vapor provided for the second absorber 6. The concentrated solution of the second generator 2 flows through the second solution heat exchanger 17 into the third generator 3. The thermal driving medium flows through the third generator 3 in which it heats the internal solution and releases the refrigerant vapor provided for the third absorber 7. The concentrated solution of the third generator 3 flows through the first solution heat exchanger 16 into the first absorber 5 in which it absorbs refrigerant vapor and releases heat to the heated medium. The refrigerant vapor of the condenser 8 releases the heat to the heated medium and becomes the refrigerant liquid. The refrigerant liquid flows through the throttle valve 11 and enters the evaporator 10 in which it absorbs waste heat and becomes the refrigerant vapor provided for the first absorber 5. The sectional regenerative third-type absorption heat pump is thereby formed.

Figure 6:
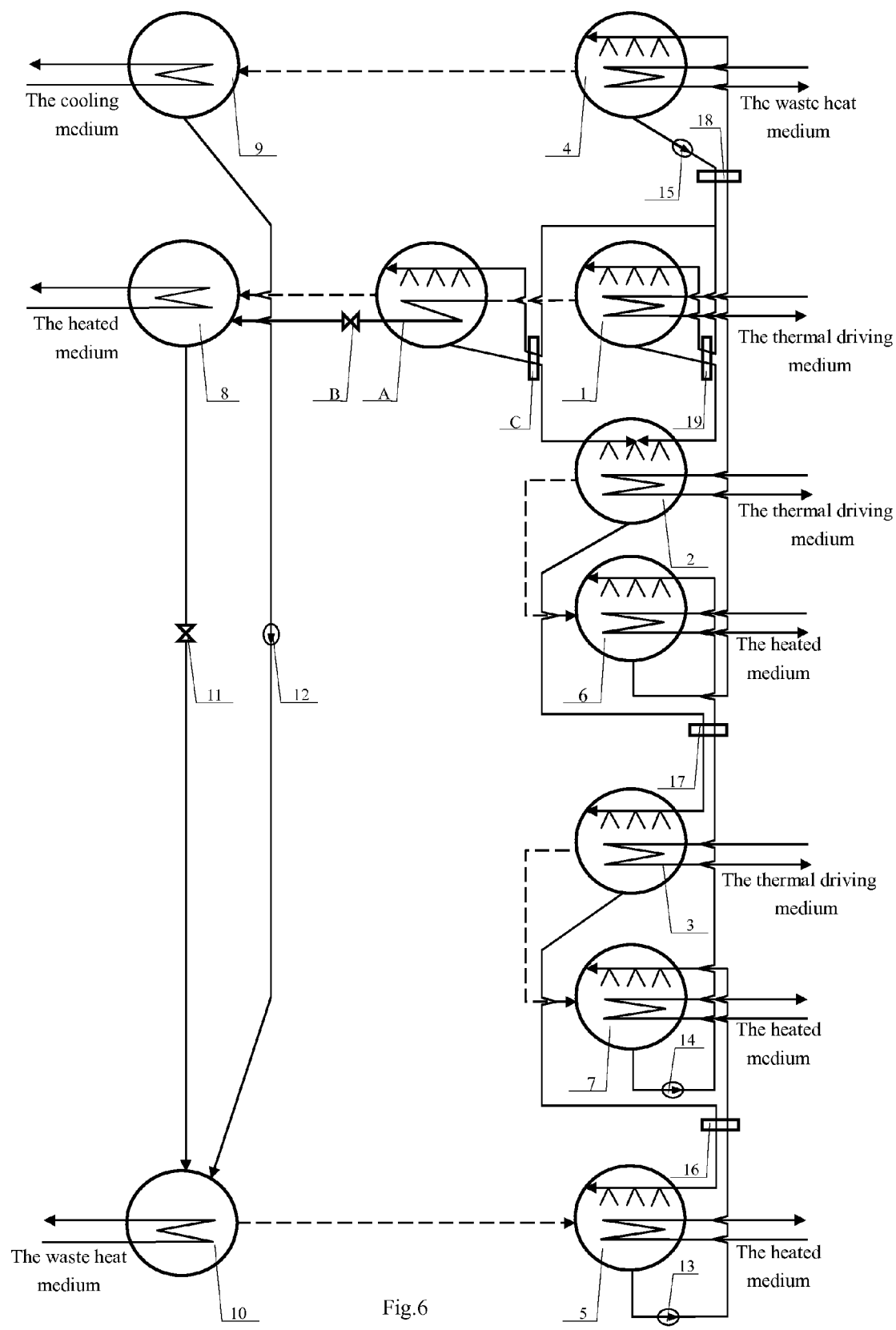
FIG. 6 is the sixth structure and flow diagram of the sectional regenerative third-type absorption heat pump.

The sectional regenerative third-type absorption heat pump shown in FIG. 6 can be realized in the following manner:

Structurally, in the sectional regenerative third-type absorption heat pump of claim 1, it further adds with a new generator A, a new throttle valve B and a new solution heat exchanger C. The concentrated solution pipe of the fourth generator 4 communicates with the first generator 1 via the third solution pump 15, the third solution heat exchanger 18 and the fourth solution heat exchanger 19 is adjusted for that the concentrated solution pipe of the fourth generator 4 flows through the third solution pump 15 and the third solution heat exchanger 18 and then respectively communicates with the first generator 1 and the new generator A via the fourth solution heat exchanger 19 and new solution heat exchanger C. The concentrated solution pipe of the new generator A communicates with the second generator 2 via the new solution heat exchanger C. The refrigerant vapor channel of the generator 1 communicates with the condenser 8 is adjusted for that the refrigerant vapor channel of the generator 1 communicates with the new generator A and then the refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. A part of concentration solution of the fourth generator 4 enters the new generator A via the third solution pump 15, the third solution heat exchanger 18 and the new solution heat exchanger C. The refrigerant vapor flows through the new generator A in which it heats the internal solution and releases the refrigerant vapor provided for the condenser 8. The concentrated solution of the new generator A flows through the new solution heat exchanger C into the second generator 2. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

Figure 7:
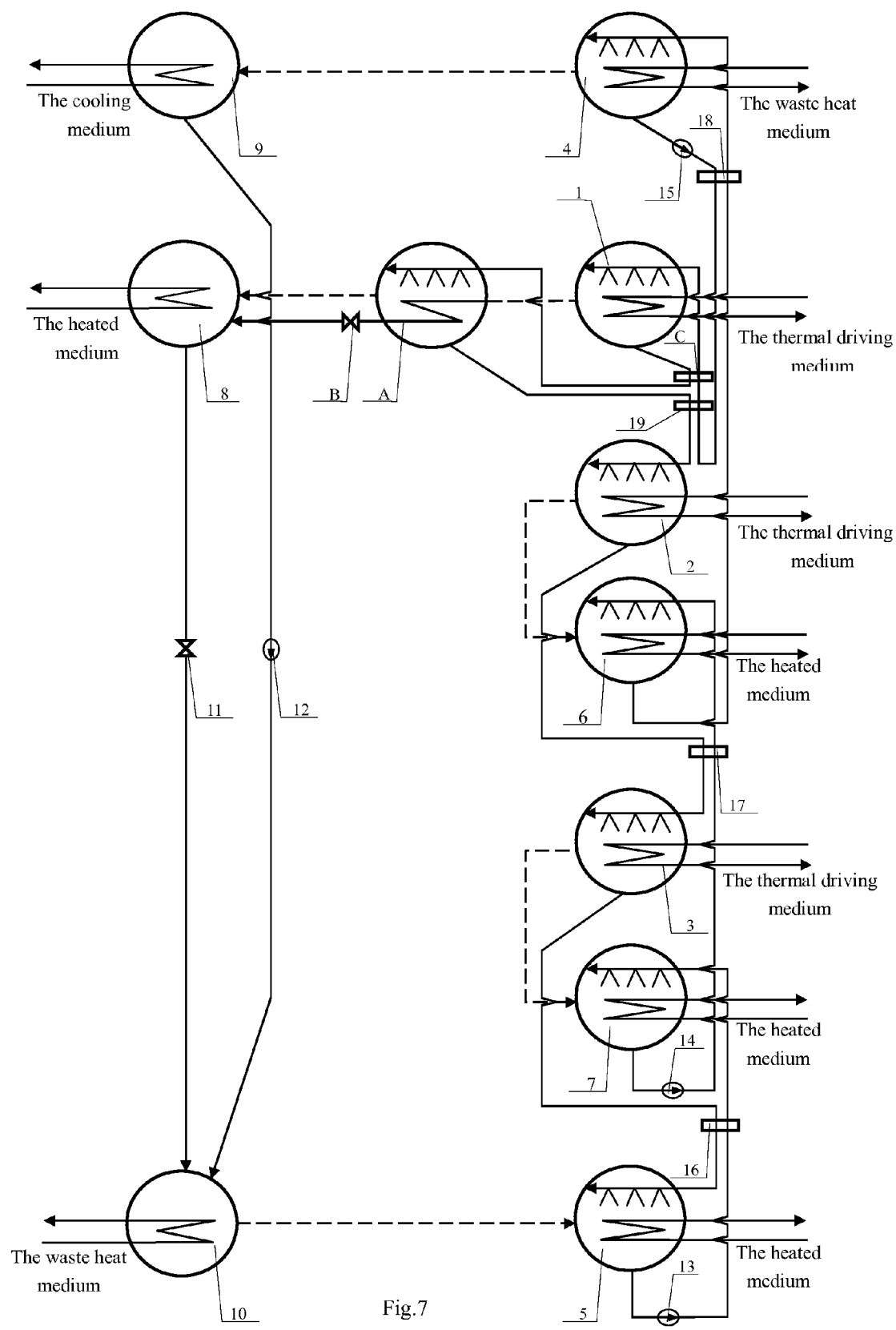
FIG. 7 is the seventh structure and flow diagram of the sectional regenerative third-type absorption heat pump.

The sectional regenerative third-type absorption heat pump shown in FIG. 7 can be realized in the following manner:

Structurally, in the sectional regenerative third-type absorption heat pump of claim 1, it further adds with a new generator A, a new throttle valve B and a new solution heat exchanger C. The concentrated solution pipe of the fourth generator 4 communicates with the first generator 1 via the third solution pump 15, the third solution heat exchanger 18 and the fourth solution heat exchanger 19 is adjusted for that the concentrated solution pipe of the fourth generator 4 communicates with the first generator 1 via the third solution pump 15, the third solution heat exchanger 18, the fourth solution heat exchanger 19 and the new solution heat exchanger C. The concentrated solution pipe of the first generator 1 communicates with the second generator 2 via the fourth solution exchanger 19 is adjusted for that the concentrated solution pipe of the first generator 1 communicates with the new generator A via the new solution heat exchanger C. The concentrated solution pipe of the new generator A communicates with the second generator 2 via the fourth solution heat exchanger 19. The refrigerant vapor channel of the generator 1 communicates with the condenser 8 is adjusted for that the refrigerant vapor channel of the generator 1 communicates with the new generator A. The refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. The concentration solution of the fourth generator 4 enters the first generator 1 via the third solution pump 15, the third solution heat exchanger 18, the fourth solution heat exchanger 19 and the new solution heat exchanger C. The concentrated solution of the first generator 1 flows through the new solution heat exchanger C into the new generator A. The refrigerant vapor flowed through the new generator A heats the internal solution and the solution releases the refrigerant vapor provided for the condenser 8. The concentrated solution of the new generator A flows through the fourth solution heat exchanger 19 into the second generator 2. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

Figure 8:
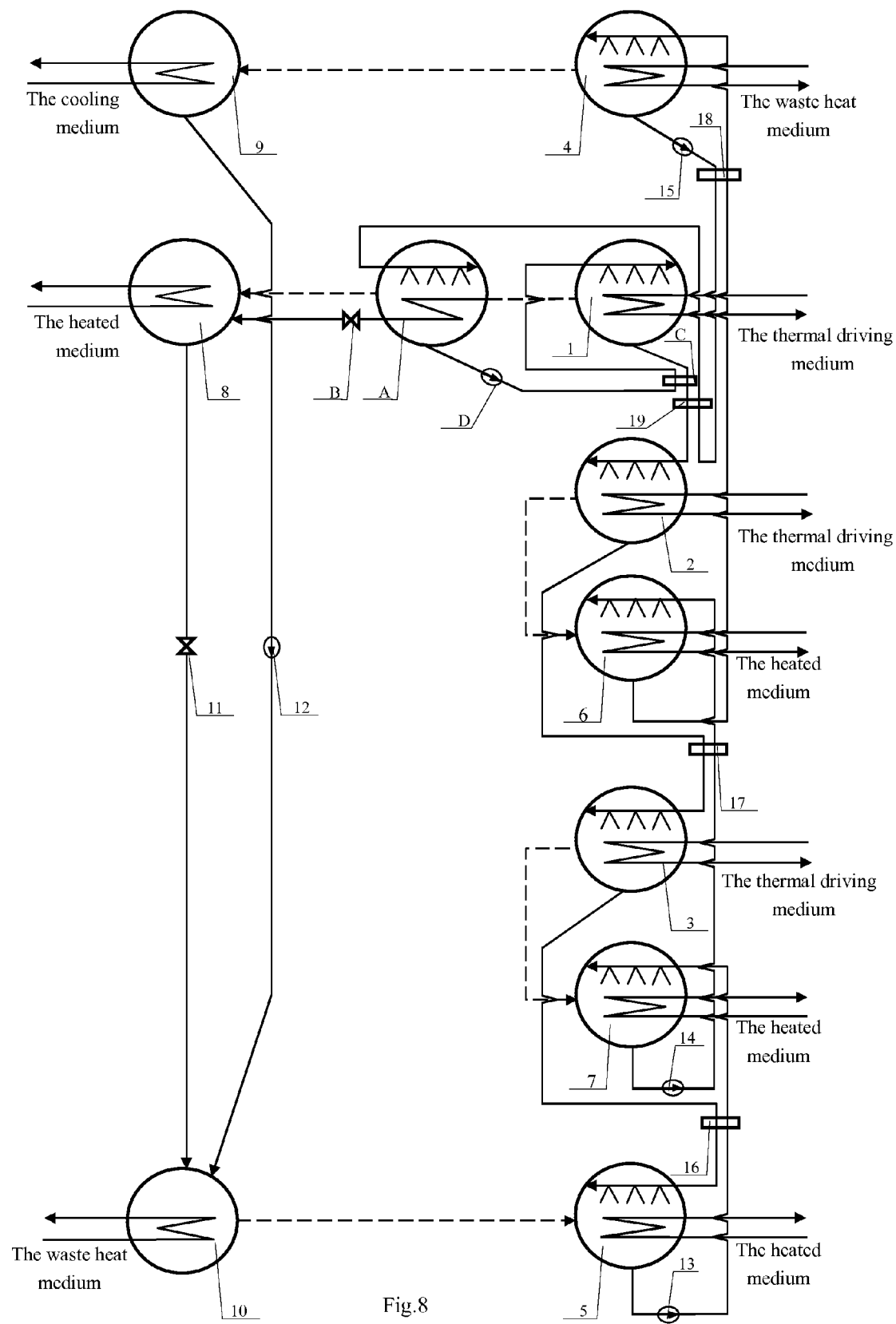
FIG. 8 is the eighth structure and flow diagram of the sectional regenerative third-type absorption heat pump.

The sectional regenerative third-type absorption heat pump shown in FIG. 8 can be realized in the following manner:

Structurally, in the sectional regenerative third-type absorption heat pump of claim 1, it further adds with a new generator A, a new throttle valve B, a new solution heat exchanger C and a new solution pump D. The concentrated solution pipe of the fourth generator 4 communicates with the first generator 1 via the third solution pump 15, the third solution heat exchanger 18 and the fourth solution heat exchanger 19 is adjusted for that the concentrated solution pipe of the fourth generator 4 communicates with the new generator A via the third solution pump 15, the third solution heat exchanger 18 and the fourth solution heat exchanger 19. The concentrated solution pipe of the new generator A communicates with the first generator 1 via the new solution pump D and the new solution heat exchanger C. The concentrated solution pipe of the first generator 1 communicates with the second generator 2 via the fourth solution heat exchanger 19 is adjusted for that the concentrated solution pipe of the first generator 1 communicates with the second generator 2 via the new solution heat exchanger C and the fourth solution heat exchanger 19. The refrigerant vapor channel of the generator 1 communicates with the condenser 8 is adjusted for that the refrigerant vapor channel of the generator 1 communicates with the new generator A. The refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. The concentration solution of the fourth generator 4 flows via the third solution pump 15, the third solution heat exchanger 18 and the fourth solution heat exchanger 19 into the new generator A. The refrigerant vapor flowed through the new generator A heats the internal solution and the solution releases the refrigerant vapor provided for the condenser 8. The concentrated solution of the new generator A flows through the new solution pump D and the new solution heat exchanger C into the first generator 1. The concentrated solution of the first generator 1 flows through the new solution heat exchanger C and the fourth solution heat exchanger 19 into the second generator 2. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

Figure 9:
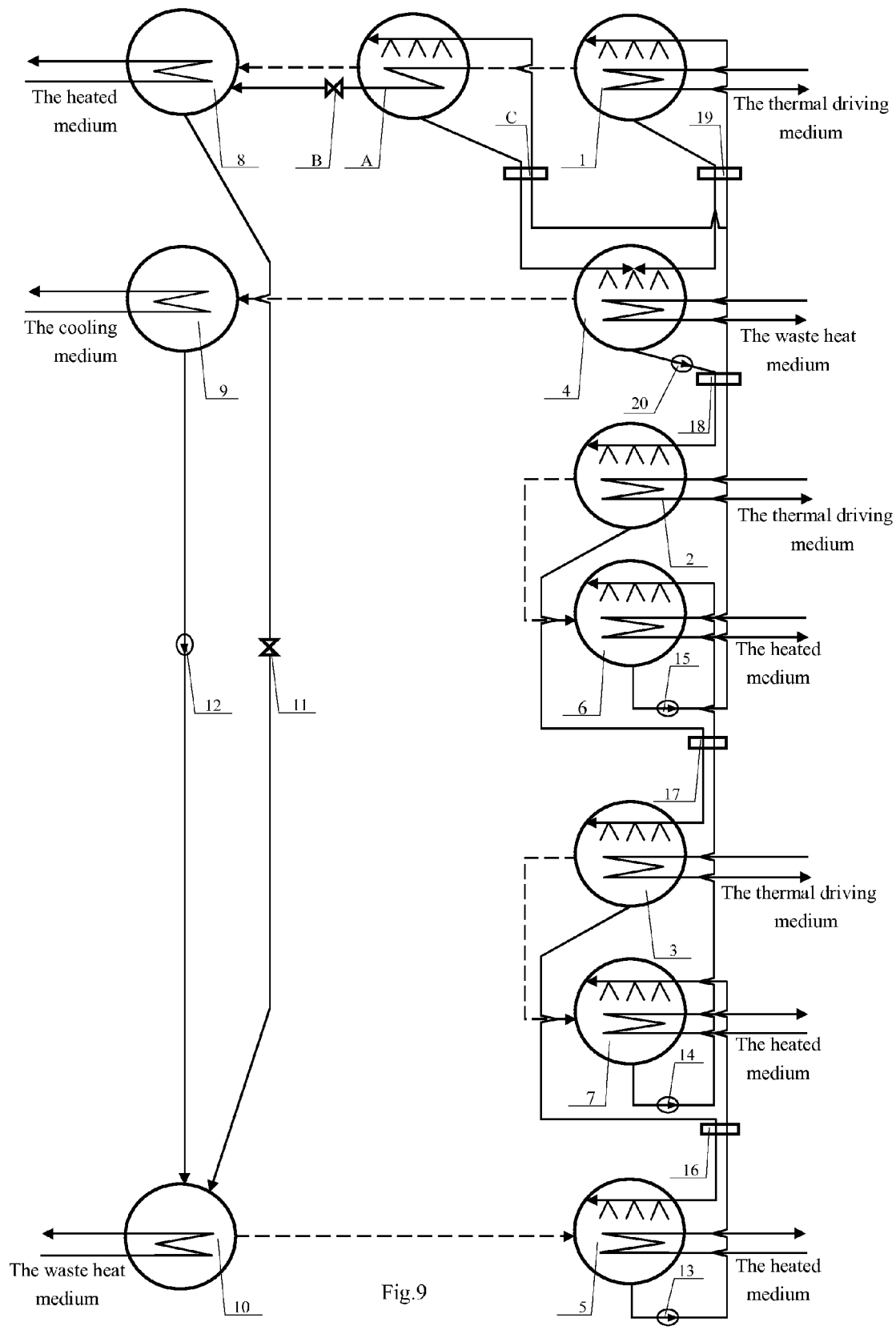
FIG. 9 is the ninth structure and flow diagram of the sectional regenerative third-type absorption heat pump.

The sectional regenerative third-type absorption heat pump shown in FIG. 9 can be realized in the following manner:

Structurally, in the sectional regenerative third-type absorption heat pump of claim 2, it further adds with a new generator A, a new throttle valve B and a new solution heat exchanger C. The dilute solution pipe of the third solution pump 15 communicates with the first generator 1 via the third solution heat exchanger 18 and the fourth solution heat exchanger 19 is adjusted for that the dilute solution pipe of the third solution pump 15 flows through the third solution heat exchanger 18, respectively communicating with the first generator 1 and the new generator A via the fourth solution heat exchanger 19 and new solution heat exchanger C. The refrigerant vapor channel of the generator 1 communicates with the condenser 8 is adjusted for that the refrigerant vapor channel of the generator 1 communicates with the new generator A. The refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. A part dilute solution of the second absorber 6 enters the new generator A via the third solution pump 15, the third solution heat exchanger 18 and the new solution heat exchanger C. The refrigerant vapor flowed through the new generator A heats the internal solution and the solution releases the refrigerant vapor provided for the condenser 8. The concentrated solution of the new generator A flows through the new solution heat exchanger C into the fourth generator 4. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

Figure 10:
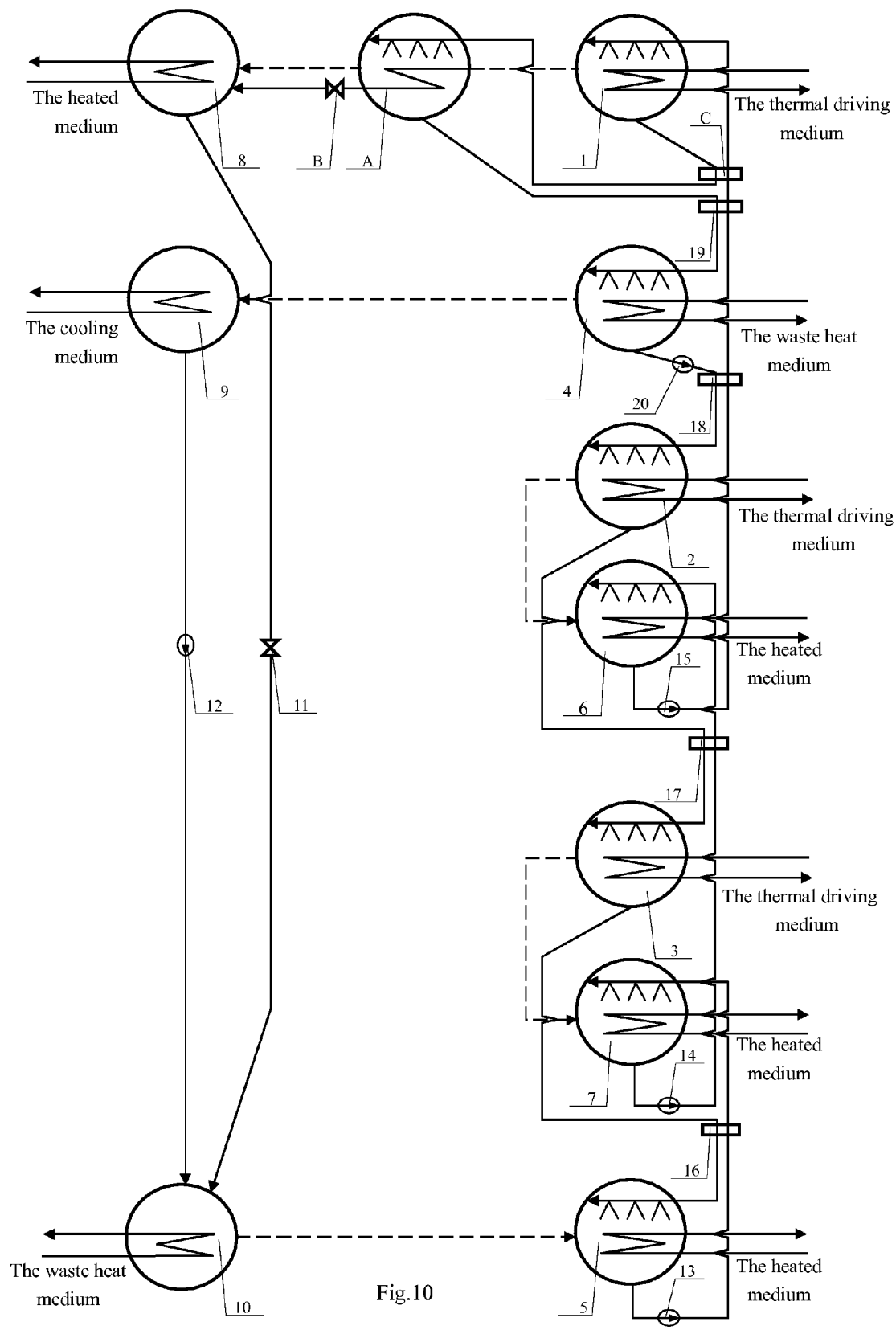
FIG. 10 is the tenth structure and flow diagram of the sectional regenerative third-type absorption heat pump.

The sectional regenerative third-type absorption heat pump shown in FIG. 10 can be realized in the following manner:

Structurally, in the sectional regenerative third-type absorption heat pump of claim 2, it further adds with a new generator A, a new throttle valve B and a new solution heat exchanger C. The dilute solution pipe of the third solution pump 15 communicates with the first generator 1 via the third solution heat exchanger 18 and the fourth solution heat exchanger 19 is adjusted for that the dilute solution pipe of the third solution pump 15 communicates with the first generator 1 via the third solution heat exchanger 18, the fourth solution heat exchanger 19 and new solution heat exchanger C. The concentrated solution pipe of the first generator 1 communicates with the fourth generator 4 via the fourth solution heat exchanger 19 is adjusted for that the dilute solution pipe of the first generator 1 communicates with the new generator A via the new solution heat exchanger C. The concentrated solution pipe of the new generator A communicates with the fourth generator 4 via the fourth solution heat exchanger 19. The refrigerant vapor channel of the generator 1 communicates with the condenser 8 is adjusted for that the refrigerant vapor channel of the generator 1 communicates with the new generator A. The refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. The dilute solution of the second absorber 6 enters the first generator 1 via the third solution pump 15, the third solution heat exchanger 18, the fourth solution heat exchanger 19 and the new solution heat exchanger C. The concentrated solution of the first generator 1 flows through the new solution heat exchanger C into the new generator A. The refrigerant vapor flowed through the new generator A heats the internal solution and the solution releases the refrigerant vapor provided for the condenser 8. The concentrated solution of the new generator A flows through the fourth solution heat exchanger 19 into the fourth generator 4. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

Figure 11:
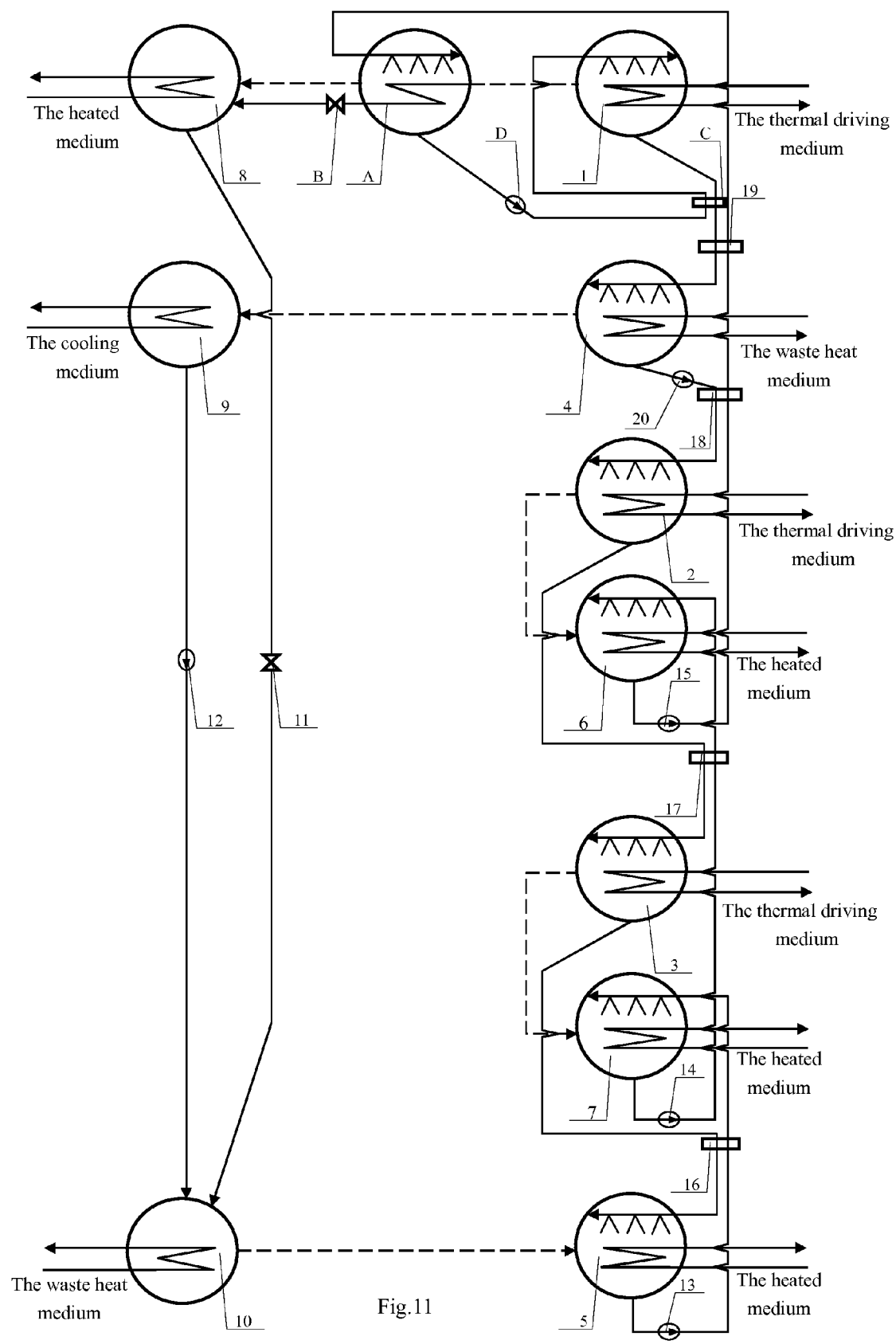
FIG. 11 is the eleventh structure and flow diagram of the sectional regenerative third-type absorption heat pump.

The sectional regenerative third-type absorption heat pump shown in FIG. 11 can be realized in the following manner:

Structurally, in the sectional regenerative third-type absorption heat pump of claim 2, it further adds with a new generator A, a new throttle valve B, a new solution heat exchanger C and a new solution pump D. The dilute solution pipe of the third solution pump 15 communicates with the first generator 1 via the third solution heat exchanger 18 and the fourth solution heat exchanger 19 is adjusted for that the dilute solution pipe of the third solution pump 15 communicates with the new generator A via the third solution heat exchanger 18 and the fourth solution heat exchanger 19. The concentrated solution pipe of the new generator A communicates with the first generator 1 via the new solution pump D and the new solution heat exchanger C. The concentrated solution pipe of the first generator 1 communicates with the fourth generator 4 via the fourth solution heat exchanger 19 is adjusted for that the refrigerant vapor channel of the first generator 1 communicates with the fourth generator 4 via new solution heat exchanger C and the fourth solution heat exchanger 19. The refrigerant vapor channel of the new generator A communicates with the condenser 8 is adjusted for that the refrigerant vapor channel of the first generator 1 communicates with the new generator A. The refrigerant liquid channel of the new generator A communicates with the condenser 8 via the new throttle valve B. The refrigerant vapor channel of the new generator A communicates with the condenser 8.

Procedurally, the refrigerant vapor produced by the first generator 1 is provided for the new generator A using as the driving heat medium. The dilute solution of the second absorber 6 enters the new generator A via the third solution pump 15, the third solution heat exchanger 18 and the fourth solution heat exchanger 19. The refrigerant vapor flowed through the new generator A heats the internal solution and the solution releases the refrigerant vapor provided for the condenser 8. The concentrated solution of the new generator A flows through the new solution pump D and the new solution heat exchanger C into the first generator 1. The concentrated solution of the first generator 1 flows through the new solution heat exchanger C and the fourth solution heat exchanger 19 into the fourth generator 4. The refrigerant vapor flowed through the new generator A releases heat and becomes refrigerant liquid. The refrigerant liquid enters the condenser 8 via the new throttle valve B. The sectional regenerative third-type absorption heat pump is thereby formed.

The Effect Achieved by the Invention Technology

The sectional regenerative third-type absorption heat pump provided by the invention has the effect and advantages as follows:

(1) The heat load of the high-temperature heating port is adjustable. The performance index of the third-type absorption heat pump is continuous and reasonable in a certain range.

(2) They can adjust the heat load of the high temperature heating port and in some range to realize the continuous and rationalization of the coefficient of performance.

(3) The solution generation process is realized by first generator 1, second generator 2 and the third generator 3. It is good for the depth utilization of the thermal driving medium and the comprehensive utilization of various high temperature heat resources. It can achieve the effective utilization of heat transfer temperature difference and improve the utilization ratio of high temperature heat resource.

(4) The second generator 2 and the second absorber 6, the third generator 3 and the third absorber 7 form the sectional regenerative process respectively, the regenerative load without restrict by the other processes can use the difference temperature and quantity high temperature resource to improve the utilization ratio of waste heat.

(5) The fourth generator 4 and the fourth absorber 21 form the regenerative process and combine the evaporator to utilize the waste heat. It uses fully the temperature difference between the waste heat medium and the cooling medium to realize the depth utilization of the waste heat resources.

(6) It enriches the third-type absorption heat pump types and extends the applications range of the third-type absorption heat pump. It is better to implement waste heat utilization with third-type absorption heat pump to improve the heat utilization ratio.

The invention claimed is:

1. A sectional regenerative third-type absorption heat pump mainly comprising a first generator (1), a second generator (2), a third generator (3), a fourth generator (4), a first absorber (5), a second absorber (6), a third absorber (7), a condenser (8), a second condenser (9), an evaporator (10), a throttle valve (11), a refrigerant liquid pump (12), a first solution pump (13), a second solution pump (14), a first solution heat exchanger (16), a second solution heat exchanger (17), a third solution heat exchanger (18) and a fourth solution heat exchanger (19), wherein a dilute solution pipe of the first absorber (5) communicates directly with the third absorber (7) via the first solution pump (13) and the first solution heat exchanger (16), a dilute solution pipe of the third absorber (7) communicates directly with the second absorber (6) via the second solution pump (14) and the second solution heat exchanger (17), a dilute solution pipe of the second absorber (6) communicates directly with the fourth generator (4) via the third solution heat exchanger (18), a concentrated solution pipe of the fourth generator (4) communicates directly with the first generator (1) via the third solution pump (15), the third solution heat exchanger (18) and the fourth solution heat exchanger (19), a concentrated solution pipe of the second generator (2) communicates directly with the third generator (3) via the second solution heat exchanger (17), a concentrated solution pipe of the third generator (3) communicates directly with the first absorber (5) via the first solution heat exchanger (16), a refrigerant vapor channel of the first generator (1) communicates directly with the condenser (8), a refrigerant vapor channel of the second generator (2) communicates directly with the second absorber (6), a refrigerant vapor channel of the third generator (3) communicates directly with the third absorber (7), a refrigerant vapor channel of the fourth generator (4) communicates directly with the second condenser (9), a refrigerant liquid pipe of the condenser (8) communicates directly with the evaporator (10) via the throttle valve (11), a refrigerant liquid pipe of the second condenser (9) communicates directly with the evaporator (10) via the refrigerant liquid pump (12), a thermal driving medium pipes of the first generator (1), the second generator (2), the third generator (3) communicate directly with the external respectively, a waste heat medium pipes of the fourth generator (4) and the evaporator (10) respectively communicates directly with the external respectively, a heated medium pipes of the first absorber (5), the second absorber (6), the third absorber (7) and the condenser (8) communicates directly with the external respectively, a cooling medium pipe of the second condenser (9) communicates directly with the external, the sectional regenerative third-type absorption heat pump is thereby formed.

2. The sectional regenerative third-type absorption heat pump, in the sectional regenerative third-type absorption heat pump of claim 1, further added with a new generator (A), a new throttle valve (B) and a new solution heat exchanger (C), wherein the concentrated solution pipe of the fourth generator (4) communicates directly with the first generator (1) via the third solution pump (15), the third solution heat exchanger (18) and the fourth solution heat exchanger (19) is adjusted for that the concentrated solution pipe of the fourth generator (4) flows through the third solution pump (15) and the third solution heat exchanger (18) and then communicates directly with the first generator (1) and the new generator (A) respectively via the fourth solution heat exchanger (19) and new solution heat exchanger (C), a concentrated solution pipe of the new generator (A) communicates directly with the second generator (2) via the new solution heat exchanger (C), the refrigerant vapor channel of the generator (1) communicates directly with the condenser (8) is adjusted for that the refrigerant vapor channel of the generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

3. The sectional regenerative third-type absorption heat pump, in the sectional regenerative third-type absorption heat pump of claim 1, further added with a new generator (A), a new throttle valve (B) and a new solution heat exchanger (C), wherein the concentrated solution pipe of the fourth generator (4) communicates directly with the first generator (1) via the third solution pump (15), the third solution heat exchanger (18) and the fourth solution heat exchanger (19) is adjusted for that the concentrated solution pipe of the fourth generator (4) communicates directly with the first generator (1) via the third solution pump (15), the third solution heat exchanger (18), the fourth solution heat exchanger (19) and the new solution heat exchanger (C), the concentrated solution pipe of the first generator (1) communicates directly with the second generator (2) via the fourth solution exchanger (19) is adjusted for that the concentrated solution pipe of the first generator (1) communicates directly with the new generator (A) via the new solution heat exchanger (C), a concentrated solution pipe of the new generator (A) communicates directly with the second generator (2) via the fourth solution heat exchanger (19), the refrigerant vapor channel of the generator (1) communicates directly with the condenser (8) is adjusted for that the refrigerant vapor channel of the generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

4. The sectional regenerative third-type absorption heat pump, in the sectional regenerative third-type absorption heat pump of claim 1, further added with a new generator (A), a new throttle valve (B), a new solution heat exchanger (C) and a new solution pump (D), wherein the concentrated solution pipe of the fourth generator (4) communicates directly with the first generator (1) via the third solution pump (15), the third solution heat exchanger (18) and the fourth solution heat exchanger (19) is adjusted for that the concentrated solution pipe of the fourth generator (4) communicates directly with the new generator (A) via the third solution pump (15), the third solution heat exchanger (18) and the fourth solution heat exchanger (19), the concentrated solution pipe of the new generator (A) communicates directly with the first generator (1) via the new solution pump (D) and the new solution heat exchanger (C), the concentrated solution pipe of the first generator (1) communicates directly with the second generator (2) via the fourth solution heat exchanger (19) is adjusted for that the concentrated solution pipe of the first generator (1) communicates directly with the second generator (2) via the new solution heat exchanger (C) and the fourth solution heat exchanger (19), the refrigerant vapor channel of the generator (1) communicates directly with the condenser (8) is adjusted for that the refrigerant vapor channel of the generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

5. A sectional regenerative third-type absorption heat pump comprising a first generator (1), a second generator (2), a third generator (3), a fourth generator (4), a first absorber (5), a second absorber (6), a third absorber (7), a condenser (8), a second condenser (9), an evaporator (10), a throttle valve (11), a refrigerant liquid pump (12), a first solution pump (13), a second solution pump (14), a first solution heat exchanger (16), a second solution heat exchanger (17), a third solution heat exchanger (18) and a fourth solution heat exchanger (19), wherein a dilute solution pipe of the first absorber (5) communicates directly with the third absorber (7) via the first solution pump (13) and the first solution heat exchanger (16), a dilute solution pipe of the third absorber (7) communicates directly with the second absorber (6) via the second solution pump (14) and the second solution heat exchanger (17), a dilute solution pipe of the second absorber (6) communicates directly with the first generator (1) via the third solution pump (15), the third solution heat exchanger (18) and the fourth solution heat exchanger (19), a concentrated solution pipe of the first generator (1) communicates directly with the fourth generator (4) via the fourth solution heat exchanger (19), a concentrated solution pipe of the fourth generator (4) communicates directly with the second generator (2) via the fourth solution pump (20) and the third solution heat exchanger (18), a concentrated solution pipe of the second generator (2) communicates directly with the third generator (3) via the second solution heat exchanger (17), a concentrated solution pipe of the third generator (3) communicates directly with the first absorber (5) via the first solution heat exchanger (16), a refrigerant vapor channel of the first generator (1) communicates directly with the condenser (8), a refrigerant vapor channel of the second generator (2) communicates directly with the second absorber (6), a refrigerant vapor channel of the third generator (3) communicates directly with the third absorber (7), a refrigerant vapor channel of the fourth generator (4) communicates directly with the second condenser (9), a refrigerant liquid pipe of the condenser (8) communicates directly with the evaporator (10) via the throttle valve (11), a refrigerant liquid pipe of the second condenser (9) communicates directly with the evaporator (10) via the refrigerant liquid pump (12), a refrigerant vapor channel of the evaporator (10) communicates directly with the first absorber (5), a thermal driving medium pipes of the first generator (1), second generator (2) and the third generator (3) communicate directly with the external respectively, a waste heat medium pipes of the fourth generator (4) and the evaporator (10) communicate directly with the external respectively, a heated medium pipes of the first absorber (5), the second absorber (6), the third absorber (7) and the condenser (8) communicate directly with the external respectively, a cooling medium pipe of the second condenser (9) communicates directly with the external, the sectional regenerative third-type absorption heat pump is thereby formed.

6. The sectional regenerative third-type absorption heat pump, in the sectional regenerative third-type absorption heat pump of claim 5, further added with a new generator (A), a new throttle valve (B) and a new solution heat exchanger (C), wherein a dilute solution pipe of the third solution pump (15) communicates directly with the first generator (1) via the third solution heat exchanger (18) and the fourth solution heat exchanger (19) is adjusted for that the dilute solution pipe of the third solution pump (15) flows through the third solution heat exchanger (18) and then communicates directly with the first generator (1) and the new generator (A) respectively via the fourth solution heat exchanger (19) and new solution heat exchanger (C), the refrigerant vapor channel of the generator (1) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

7. The sectional regenerative third-type absorption heat pump, in the sectional regenerative third-type absorption heat pump of claim 5, further added with a new generator (A), a new throttle valve (B) and a new solution heat exchanger (C), wherein the dilute solution pipe of the third solution pump (15) communicates directly with the first generator (1) via the third solution heat exchanger (18) and the fourth solution heat exchanger (19) is adjusted for that the dilute solution pipe of the third solution pump (15) communicates directly with the first generator (1) via the third solution heat exchanger (18), the fourth solution heat exchanger (19) and new solution heat exchanger (C), the concentrated solution pipe of the first generator (1) communicates directly with the fourth generator (4) via the fourth solution heat exchanger (19) is adjusted for that the dilute solution pipe of the first generator (1) communicates directly with the new generator (A) via the new solution heat exchanger (C), a concentrated solution pipe of the new generator (A) communicates directly with the fourth generator (4) via the fourth solution heat exchanger (19), the refrigerant vapor channel of the generator (1) communicates directly with the condenser (8) is adjusted for that the refrigerant vapor channel of the generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

8. The sectional regenerative third-type absorption heat pump, in the sectional regenerative third-type absorption heat pump of claim 5, further added with a new generator (A), a new throttle valve (B), a new solution heat exchanger (C) and a new solution pump (D), wherein the dilute solution pipe of the third solution pump (15) communicates directly with the first generator (1) via the third solution heat exchanger (18) and the fourth solution heat exchanger (19) is adjusted for that the dilute solution pipe of the third solution pump (15) communicates directly with the new generator (A) via the third solution heat exchanger (18) and the fourth solution heat exchanger (19), a concentrated solution pipe of the new generator (A) communicates directly with the first generator (1) via the new solution pump (D) and the new solution heat exchanger (C), the concentrated solution pipe of the first generator (1) communicates directly with the fourth generator (4) via the fourth solution heat exchanger (19) is adjusted for that the refrigerant vapor channel of the first generator (1) communicates directly with the fourth generator (4) via new solution heat exchanger (C) and the fourth solution heat exchanger (19), a refrigerant vapor channel of the new generator (A) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

9. A sectional regenerative third-type absorption heat pump mainly comprising a first generator (1), a second generator (2), a third generator (3), a fourth generator (4), a first absorber (5), a second absorber (6), a third absorber (7), a condenser (8), a second condenser (9), an evaporator (10), a throttle valve (11), a refrigerant liquid pump (12), a first solution pump (13), a second solution pump (14), a first solution heat exchanger (16), a second solution heat exchanger (17), a third solution heat exchanger (18) and a fourth solution heat exchanger (19), wherein the dilute solution pipe of the first absorber (5) communicates directly with the third absorber (7) via the first solution pump (13) and the first solution heat exchanger (16), a dilute solution pipe of the third absorber (7) communicates directly with the second absorber (6) via the second solution pump (14) and the second solution heat exchanger (17), a dilute solution pipe of the second absorber (6) communicates directly with the first generator (1) via the third solution pump (15) and the third solution heat exchanger (18), a concentrated solution pipe of the first generator (1) communicates directly with the second generator (2) via the third solution heat exchanger (18), a concentrated solution pipe of the first generator (1) communicates directly with the second generator (2) via the third solution heat exchanger (18), a concentrated solution pipe of the second generator (2) communicates directly with the third generator (3) via the second solution heat exchanger (17), a concentrated solution pipe of the third generator (3) communicates directly with the fourth generator (4) via the first solution heat exchanger (16) and the fourth solution heat exchanger (19), a concentrated solution pipe of the fourth generator (4) communicates directly with the first absorber (5) via the fourth solution pump (20) and the fourth solution heat exchanger (19), a refrigerant vapor channel of the first generator (1) communicates directly with the condenser (8), a refrigerant vapor channel of the second generator (2) communicates directly with the second absorber (6), a refrigerant vapor channel of the third generator (3) communicates directly with the third absorber (7), a refrigerant vapor channel of the fourth generator (4) communicates directly with the second condenser (9), a refrigerant liquid pipe of the condenser (8) communicates directly with the evaporator (10) via the throttle valve (11), a refrigerant liquid pipe of the second condenser (9) communicates directly with the evaporator (10) via the refrigerant liquid pump (12), the a refrigerant vapor channel of the evaporator (10) communicates directly with the first absorber (5), a thermal driving medium pipes of the first generator (1), second generator (2) and the third generator (3) communicate directly with the external respectively, a waste heat medium pipes of the fourth generator (4) and the evaporator (10) communicate directly with the external respectively, a heated medium pipes of the first absorber (5), the second absorber (6), the third absorber (7) and the condenser (8) communicate directly with the external respectively, a cooling medium pipe of the second condenser (9) communicates directly with the external, the sectional regenerative third-type absorption heat pump is thereby formed.

10. A sectional regenerative third-type absorption heat pump mainly comprising a first generator (1), a second generator (2), a third generator (3), a fourth generator (4), a first absorber (5), a second absorber (6), a third absorber (7), a fourth absorber (21), a condenser (8), an evaporator (10), a throttle valve (11), a first solution pump (13), a second solution pump (14), a third solution pump (15), a fourth solution pump (20), a first solution heat exchanger (16), a second solution heat exchanger (17), a third solution heat exchanger (18) and a fourth solution heat exchanger (19), wherein a dilute solution pipe of the first absorber (5) communicates directly with the fourth absorber (21) via the fourth solution pump (19), a dilute solution pipe of the fourth absorber (21) communicates directly with the third absorber (7) via the first solution pump (13) and the second solution heat exchanger (17), a dilute solution pipe of the third absorber (7) communicates directly with the second absorber (6) via the second solution pump (14) and the second solution heat exchanger (17), a dilute solution pipe of the second absorber (6) communicates directly with the first generator (1) via the third solution pump (15) and the third solution heat exchanger (18), a concentrated solution pipe of the first generator (1) communicates directly with the second generator (2) via the third solution heat exchanger (18), a concentrated solution pipe of the second generator (2) communicates directly with the third generator (3) via the second solution heat exchanger (17), a concentrated solution pipe of the third generator (3) communicates directly with the fourth generator (4) via the first solution heat exchanger (16), a concentrated solution pipe of the fourth generator (4) communicates directly with the first absorber (5) via the fourth solution pump (20) and the fourth solution heat exchanger (19), a refrigerant vapor channel of the first generator (1) communicates directly with the condenser (8), a refrigerant vapor channel of the second generator (2) communicates directly with the second absorber (6), a refrigerant vapor channel of the third generator (3) communicates directly with the third absorber (7), a refrigerant vapor channel of the fourth generator (4) communicates directly with the fourth absorber (21), a refrigerant liquid pipe of the condenser (8) communicates directly with the evaporator (10) via the throttle valve (11), a refrigerant vapor channel of the evaporator (10) communicates directly with the first absorber (5), a thermal driving medium pipes of the first generator (1), second generator (2) and the third generator (3) communicate directly with the external respectively, a waste heat medium pipes of the fourth generator (4) and the evaporator (10) communicate directly with the external respectively, a heated medium pipes of the first absorber (5), the second absorber (6), the third absorber (7) and the condenser (8) communicate directly with the external respectively, a cooling medium pipe of the fourth absorber (21) communicates directly with the external, the sectional regenerative third-type absorption heat pump is thereby formed.

11. The sectional regenerative third-type absorption heat pump, in the sectional regenerative third-type absorption heat pump of claim 9 or 10, further added with a new generator (A), a new throttle valve (B) and a new solution heat exchanger (C), wherein the dilute solution pipe of the third solution pump (15) communicates directly with the new generator (A) via the new solution heat exchanger (C), a concentrated solution pipe of the new generator (A) communicates directly with the second generator (2) via the new solution heat exchanger (C), the refrigerant vapor channel of the first generator (1) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

12. The sectional regenerative third-type absorption heat pump, in the sectional regenerative third-type absorption heat pump of claim 9 or 10, further added with a new generator (A), a new throttle valve (B) and a new solution heat exchanger (C), wherein a dilute solution pipe of the third solution pump (15) communicates directly with the first generator (1) via the third solution heat exchanger (18) is adjusted for that the dilute solution pipe of the third solution pump (15) communicates directly with the first generator (1) via the third solution heat exchanger (18) and the new solution heat exchanger (C), the concentrated solution pipe of the first generator (1) communicates directly with the second generator (2) via the third solution heat exchanger (18) is adjust for that the concentrated solution pipe of the first generator (1) communicates directly with the new generator (A) via the new solution heat exchanger (C), a concentrated solution pipe of the new generator (A) communicates directly with the second generator (2) via the third solution heat exchanger (18), the refrigerant vapor channel of the first generator (1) communicates directly with the condenser (8) is adjusted for that the refrigerant vapor channel of the first generator (1) communicates directly with the new generator (A) and then the a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

13. The sectional regenerative third-type absorption heat pump, in the sectional regenerative third-type absorption heat pump of claim 9 or 10, further added with a new generator (A), a new throttle valve (B), a new solution heat exchanger (C) and a new solution pump (D), wherein a dilute solution pipe of the third solution pump (15) communicates directly with the first generator (1) via the third solution heat exchanger (18) is adjusted for that the dilute solution pipe of the third solution pump (15) communicates directly with the new generator (A) via the third solution heat exchanger (18), a concentrated solution pipe of the new generator (A) communicates directly with the second generator (2) via the third solution heat exchanger (18) is adjust for that the concentrated solution pipe of the first generator (1) communicates directly with the second generator (2) via the new solution heat exchanger (C) and the third solution heat exchanger (18), the concentrated solution pipe of the first generator (1) communicates directly with the second generator (2) via the third solution heat exchanger (18) is adjusted for that the concentrated solution pipe of the first generator (1) communicates directly with the second generator (2) via the new solution heat exchanger (C) and the third solution heat exchanger (18), the refrigerant vapor channel of the first generator (1) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

14. A sectional regenerative third-type absorption heat pump mainly comprising a first generator (1), a second generator (2), a third generator (3), a fourth generator (4), a first absorber (5), a second absorber (6), a third absorber (7), a fourth absorber (21), a condenser (8), an evaporator (10), a throttle valve (11), a first solution pump (13), a second solution pump (14), a third solution pump (15), a fourth solution pump (20), a first solution heat exchanger (16), a second solution heat exchanger (17), a third solution heat exchanger (18) and a fourth solution heat exchanger (19), wherein a dilute solution pipe of the first absorber (5) communicates directly with the third absorber (7) via the first solution pump (13) and the first solution heat exchanger (16), a dilute solution pipe of the third absorber (7) communicates directly with the second absorber (6) via the second solution pump (14) and the second solution heat exchanger (17), a dilute solution pipe of the second absorber (6) communicates directly with the fourth absorber (21) via the third solution pump (18), a dilute solution pipe of the fourth absorber (21) communicates directly with the first generator (1) via the third solution pump (15) and the fourth solution heat exchanger (19), a concentrated solution pipe of the fourth generator (4) communicates directly with the second generator (2) via the fourth solution pump (20) and the third solution heat exchanger (18), a concentrated solution pipe of the second generator (2) communicates directly with the third generator (3) via the second solution heat exchanger (17), a concentrated solution pipe of the third generator (3) communicates directly with the first absorber (5) via the first solution heat exchanger (16), a refrigerant vapor channel of the first generator (1) communicates directly with the condenser (8), a refrigerant vapor channel of the second generator (2) communicates directly with the second absorber(6), a refrigerant vapor channel of the third generator (3) communicates directly with the third absorber (7), a refrigerant vapor channel of the fourth generator (4) communicates directly with the fourth absorber (21), a refrigerant liquid pipe of the condenser (8) communicates directly with the evaporator (10) via the throttle valve (11), a refrigerant vapor channel of the evaporator (10) communicates directly with the first absorber (5), a thermal driving medium pipes of the first generator (1), second generator (2) and the third generator (3) communicate directly with the external respectively, a waste heat medium pipes of the fourth generator (4) and the evaporator (10) communicate directly with the external respectively, a heated medium pipes of the first absorber (5), the second absorber (6), the third absorber (7) and the condenser (8) communicate directly with the external respectively, a cooling medium pipe of the fourth absorber (21) communicates directly with the external, the sectional regenerative third-type absorption heat pump is thereby formed.

15. The sectional regenerative third-type absorption heat pump, in the sectional regenerative third-type absorption heat pump of claim 14, further added with a new generator (A), a new throttle valve (B) and a new solution heat exchanger (C), wherein a dilute solution pipe of the third solution pump (15) communicates directly with the new generator (A) via the new solution heat exchanger (C), the concentrated solution pipe of the new generator (A) communicates directly with the fourth generator (4) via the new solution heat exchanger (C), the refrigerant vapor channel of the first generator (1) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

16. The sectional regenerative third-type absorption heat pump, in the sectional regenerative third-type absorption heat pump of claim 14, further added with a new generator (A), a new throttle valve (B) and a new solution heat exchanger (C), wherein a dilute solution pipe of the third solution pump (15) communicates directly with the first generator (1) via the fourth solution heat exchanger (19) is adjusted for that the dilute solution pipe of the third solution pump (15) communicates directly with the first generator (1) via the fourth solution heat exchanger (19) and the new solution heat exchanger (C), the concentrated solution pipe of the first generator (1) communicates directly with the fourth generator (4) via the fourth solution heat exchanger (19) is adjust for that the concentrated solution pipe of the first generator (1) communicates directly with the new generator (A) via the new solution heat exchanger (C), a concentrated solution pipe of the new generator (A) communicates directly with the fourth generator (4) via the fourth solution heat exchanger (19), the refrigerant vapor channel of the first generator (1) communicates directly with the condenser (8) is adjusted for that the refrigerant vapor channel of the first generator (1) communicates directly with the new generator (A) and then the a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

17. The sectional regenerative third-type absorption heat pump, in the sectional regenerative third-type absorption heat pump of claim 14, further added with a new generator (A), a new throttle valve (B), a new solution heat exchanger (C) and a new solution pump (D), wherein a dilute solution pipe of the third solution pump (15) communicates directly with the first generator (1) via the fourth solution heat exchanger (19) is adjusted for that the dilute solution pipe of the third solution pump (15) communicates directly with the new generator (A) via the fourth solution heat exchanger (19), the concentrated solution pipe of the new generator (A) communicates directly with the first generator (1) via the new solution pump (D) and the new solution heat exchanger (C), the concentrated solution pipe of the first generator (1) communicates directly with the fourth generator (4) via the fourth solution heat exchanger (19) is adjusted for that the concentrated solution pipe of the first generator (1) communicates directly with the fourth generator (4) via the new solution heat exchanger (C) and the fourth solution heat exchanger (19), the refrigerant vapor channel of the first generator (1) communicates directly with the condenser (8) is adjusted for that the refrigerant vapor channel of the first generator (1) communicates directly with the new generator (A) and then a refrigerant liquid channel of the new generator (A) communicates directly with the condenser (8) via the new throttle valve (B), a refrigerant vapor channel of the new generator (A) communicates directly with the condenser (8), the sectional regenerative third-type absorption heat pump is thereby formed.

\* \* \* \* \*